United States Patent
Bryant et al.

(10) Patent No.: US 8,321,160 B2
(45) Date of Patent: *Nov. 27, 2012

(54) REMOTELY RECONFIGURABLE SYSTEM FOR MAPPING SUBSURFACE GEOLOGICAL ANOMALIES

(75) Inventors: John Bryant, Carollton, TX (US); H. Michael Willey, Garland, TX (US); Guenter H. Lehmann, Sachse, TX (US); Arash Tom Salamat, Plano, TX (US); Michael Edgar, McKinney, TX (US); Jerry Leopold, Richardson, TX (US)

(73) Assignee: Bryant Consultants, Inc., Carrollton, TX (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/587,953

(22) Filed: Oct. 15, 2009

(65) Prior Publication Data

US 2010/0194396 A1    Aug. 5, 2010

Related U.S. Application Data

(63) Continuation-in-part of application No. 11/472,901, filed on Jun. 22, 2006, now Pat. No. 7,386,402.

(51) Int. Cl.
*G01R 11/04* (2006.01)
*G01R 11/02* (2006.01)
*G01R 17/02* (2006.01)
*G06F 3/01* (2006.01)

(52) U.S. Cl. ............... 702/57; 702/53; 702/64; 702/183

(58) Field of Classification Search ............... 702/7, 12, 702/13, 53, 57, 64, 109, 182, 183, 188; 73/357, 73/627; 324/357; 340/856.3

See application file for complete search history.

(56) References Cited

U.S. PATENT DOCUMENTS

| | | | |
|---|---|---|---|
| 3,967,201 A | 6/1976 | Rorden | |
| 4,015,234 A | 3/1977 | Krebs | |
| 4,539,640 A * | 9/1985 | Fry et al. | 600/547 |
| 5,587,659 A * | 12/1996 | Sørensen | 324/357 |
| 6,003,376 A * | 12/1999 | Burns et al. | 73/584 |
| 6,025,735 A | 2/2000 | Gardner et al. | |
| 6,226,601 B1 | 5/2001 | Longaker | |
| 6,295,512 B1 | 9/2001 | Bryant | |
| 6,313,755 B1 * | 11/2001 | Hetmaniak et al. | 340/856.3 |
| 6,332,109 B1 | 12/2001 | Sheard et al. | |
| 6,975,942 B2 | 12/2005 | Young et al. | |
| 6,977,505 B1 | 12/2005 | Rosenquist | |
| 7,114,561 B2 | 10/2006 | Vinegar et al. | |
| 7,357,028 B2 * | 4/2008 | Kim | 73/627 |
| 7,386,402 B2 * | 6/2008 | Bryant | 702/57 |
| 7,788,049 B2 * | 8/2010 | Bryant et al. | 702/57 |
| 7,813,883 B2 * | 10/2010 | Bryant | 702/57 |
| 2003/0040882 A1 | 2/2003 | Sheard et al. | |
| 2003/0205376 A1 | 11/2003 | Ayoub et al. | |
| 2004/0225444 A1 | 11/2004 | Young et al. | |
| 2004/0238165 A1 | 12/2004 | Salamitou et al. | |
| 2005/0027453 A1 | 2/2005 | Fort et al. | |
| 2005/0090988 A1 | 4/2005 | Bryant | |
| 2005/0165555 A1 | 7/2005 | Jackson | |
| 2006/0028208 A1 | 2/2006 | Strack | |

* cited by examiner

*Primary Examiner* — Michael Nghiem
*Assistant Examiner* — Felix Suarez
(74) *Attorney, Agent, or Firm* — Schultz & Associates, P.C.

(57) ABSTRACT

A method and apparatus are provided for detecting and transmitting geophysical data from a plurality of electrodes inserted into the soil utilizing a set of identical dynamically reconfigurable voltage control units located on each electrode and connected together by a communications and power cable. A test sequence is provided in each voltage control unit. Each voltage control unit records data measurements for transmission to a central data collector. Each voltage control unit incorporates and determines its positional relationship to other voltage control units by logging when the unit is attached to the electrode. Each voltage control unit I equipped with a magnetic switch for detecting when they are in contact with the electrode.

13 Claims, 27 Drawing Sheets

REMOTELY RECONFIGURABLE SYSTEM FOR MAPPING SUBSURFACE GEOLOGICAL ANOMALIES

This application is a Continuation-In-Part claiming priority benefit from U.S. patent application Ser. No. 11/472,901 which was filed on Jun. 22, 2006, now U.S. Pat. No. 7,386,402, issued on Jun. 10, 2008 and from U.S. patent application Ser. No. 11/982,484 which was filed on Nov. 1, 2007, now U.S. Pat. No. 7,788,049, issued on Aug. 31, 2010.

TECHNICAL FIELD OF THE INVENTION

This preferred embodiment relates to a method for producing a subsurface electrical resistivity model. More specifically, the preferred embodiment relates to a method for resistivity modeling for locating anomalies, such as groundwater, leaks, tree roots, and other vegetation, particularly beneath and around existing composite concrete structures and roadbeds. Raw resistivity data is collected by a reconfigurable network of sensors that distributes current and measures voltage. A regression correlation is performed on the raw resistivity data to create a resistivity model, which is converted to graphical form, then analyzed to detect and locate subsurface soil anomalies.

BACKGROUND OF THE INVENTION

Modern concrete structures are usually composites which utilize embedded materials such as steel and aggregate stone for strength and durability. Some examples of concrete structures include roadways and slab-on-grade foundations. The most common modern roadway paving materials are concrete and asphalt while slab-on-grade foundations are primarily concrete. Typical concrete exhibits extraordinary resistance to compressive forces but lower resistance to tensile forces and vibration. Concrete composites include steel bars, steel wire mesh or fiber materials added to vary the characteristics of the concrete and to increase its resistance to tensile forces and vibration.

The use of reinforced concrete composite was prevalent during construction of the interstate highway system in the United States. An updated form of steel reinforced concrete is still used today for urban traffic applications. Bridge decks and bridge footings also extensively employ reinforced concrete.

Roadway structures use other forms of surfacing that incorporate composite materials and steel reinforcement. Asphalt pavements are applied to a compacted gravel base generally at least as thick as the asphalt layer, but some asphalt pavements are built directly on the native subgrade. In areas with very soft or expansive subgrades such as clay, thick gravel bases or stabilization of the subgrade with cement or lime can be required. Subgrade stabilization can include use of steel mesh or reinforced concrete applied to the roadbed under asphalt pavement.

Slab-on-grade foundations are shallow foundations that are often constructed of concrete using reinforcing methods. Slab-on-grade foundations are typically prone to cracking due to defication when the subgrade becomes unstable. To reduce the effects of subgrade instability, steel, wire mesh, fiber composites and tension cables are employed in the concrete. Post-tensioning is a method of strengthening concrete using high-strength steel strands or cables, typically referred to as tendons. The tendons rest on anchors in the concrete. Tension is applied to the cables used to place the concrete in compression.

Two cases arise where it is often necessary to determine fluid leaks, subsurface fluid flow and subsurface anomalies such as land faults and buried inclusions.

In the first case, preparation of a roadbed or construction site for building requires that an analysis of subsurface anomalies and subsurface fluid flow in order to adequately plan for and construct either a road or a concrete foundation.

In this case, detecting subsurface anomalies is a difficult task because limited time and resources often prevents a sufficient sample size to be adequately confident that the site located is free from anomalies or subsurface fluid flow.

In the second case, a reinforced concrete or asphalt structure is already in place. Testing is necessary to determine subsurface leaks, subsurface anomalies or subsurface fluid flow after construction.

Detecting and locating fluid leaks and other subsurface anomalies beneath composite concrete and asphalt structures is often a difficult task because the concrete or asphalt prevents access to the soil underneath. Removal of sections of the concrete to inspect the subjacent soil is often required. Methods of the prior art often require destruction of large sections of the composite structures to locate leaks and other subsurface anomalies because the exact location of the leak or anomaly is unknown.

Methods currently exist for detecting and locating leaks from landfills, hazardous waste dumps, impoundments, and other outdoor fluid containment areas by measuring changes in the conductivity and/or resistivity of the adjacent soil. Daily et al. '406 discloses a "mise-a-la-masse" technique and an electrical resistance tomography technique.

The mise-a-la-masse technique involves placement of several electrodes, one inside and several outside the facility. An electronic potential is applied to different pairs of electrodes, but always includes the electrodes in the fluid containment facility. Voltage differences are then measured between various combinations of electrodes. The leak location is determined from the coordinates of a current source profile that best fits the measured potentials within the constraints of the known or assumed resistivity distribution. However, because the potentially leaking fluid must be driven to a potential, mise-a-la-masse methods can monitor for leaks in continuous fluid systems only, such as ponds, lined fluid containment areas, and tanks.

Electrical resistivity tomography (ERT) involves placing electrodes around the periphery of, beneath, or, in the case of subsurface containment vessels, above the facility. A known current is applied to alternating pairs of electrodes, and then the electrical potential is measured across other alternating pairs of electrodes. The measurements allow calibration of electrical resistivity (or conductance) over a plurality of points in the soil. Differences in resistivity correlate directly with migration of leaking fluid. However, Daily does not disclose a method or apparatus that allows the electrodes to be placed directly under the leak source, after construction of a structure or paved roadway.

Henderson '202 and '045 both disclose directly monitoring the soil subjacent to a fluid containment area by burying electrodes directly beneath the containment. Both Henderson patents disclose a plurality of four-plate electrode systems. A voltage and a known current are applied across the outer pair of plates. The resulting potential difference is measured across the inner pair. Henderson '045 also discloses a system of individual electrodes that, by varying the spacing between the electrodes impressing a current into the ground and the spacing of the potential measurement electrodes, can indirectly measure the resistivity at a calculated depth. However, Henderson '045 does not disclose a method of directly monitoring the subgrade beneath a structure without permanently burying the electrodes or a method to place electrodes beneath an existing structure.

Woods et al. '244 discloses a leak detection system for radioactive waste storage tanks. The system comprises a metal tank, an AC generator connected between the tank and a reference electrode, and a plurality of reference electrodes. When the generator is energized, it creates an electric field in the ground between the tank and the reference electrode. A voltmeter measures the potential difference between the sensing electrodes and the tank. A significant change in the potential at one or more of the sensing electrodes indicates that the tank has developed a leak. Woods et al. has a number of disadvantages. First, it requires an electrically conductive fluid container. Second, it requires that the electrodes be permanently buried in the soil surrounding the tank. Finally, it requires the use of an AC generator, which is less convenient than a DC power source.

Bryant '625 discloses a method and apparatus for creating an electrical resistivity map of the volume beneath a slab foundation by placing electrodes through a foundation, and applying a current through them. Bryant '625 further discloses a method for converting the measured potential to a resistivity value, assigning the resistivity value to a spatial coordinate, and storing a plurality of values in computer files. The apparatus includes an array of electrodes that are used to impress a known current in the soil and measure the resulting electrical potential of electrodes. Typically, a pair of electrodes is used to impress a constant current, and another pair is used to measure a voltage potential.

The array of electrodes is interconnected by electrical conducting cables that connect to the various electrodes at predetermined intervals. The interconnecting cables transmit electrical current that passes through certain electrodes to create the electrical field within the underlying and subjacent soil, and return electrical signals from other measuring electrodes that detect the electrical field within the soil. However, Bryant does not disclose the ability to switch current between nodes or to conduct an orderly permutation of voltage measurements between nodes.

None of the prior art is entirely satisfactory to locate fluid leaks beneath composite and reinforced concrete structures or to analyze them in near real time. For instance, it is not practical to electrify the potentially leaking fluid and because there may exist multiple sources of fluid, mise-a-la-masse is not a practical option. Nor is it practical to embed permanently a series of electrodes beneath an existing massive concrete structure or roadway to monitor soil resistivity. Further, because some of the ERT methods use multiple-plate electrodes where a large hole is bored to insert the electrodes into the subjacent soil making the method impractical and destructive. In addition, placing the electrodes around the periphery of a roadbed or foundation is less accurate compared to placing the electrodes directly beneath or adjacent the potential leak source.

The current state of the art is unsatisfactory because it does not provide a method to remotely change injection current locations or to conduct an orderly progression through a permutation of voltages and currents between nodes. Moreover, the state of the art does not provide for dynamically addressable sensors whose location and address can be changed on the fly.

Furthermore, the present state of the art requires that the electrodes be placed in a linear, regularly spaced grid pattern that does not provide needed flexibility in the physical layout of arrays of electrodes in multiple, non-linear arrangements. The present state of the art presumes the locations of the electrodes to one another. It may be necessary to arrange the electrodes in a non-linear grid if the physical layout of the concrete or underlying area to be measured prevents the layout of electrodes in a typical, linear grid arrangement. It may be necessary to locate certain electrodes in a non-linear pattern to accommodate obstructions in the existing structures foundation or to conform the layout of the grid to a particular stretch or curvature of a paved roadway or bridge, or other geographic anomaly. Furthermore, the prior art does not provide for a means to easily adjust an array of electrodes to avoid encapsulated steel structures such as rebar. Where a need arises to arrange the electrodes in a non-linear grid, it may be necessary to identify the spatial relationship of the electrodes. Likewise, it may be necessary to adjust the location of certain electrodes to accommodate obstructions and thus, it may be necessary to identify the new location.

Furthermore, the present state of the art requires that electrodes be placed according to a measured or surveyed pattern at the physical location. The requirement of physically measuring and placing electrodes is hampered by structures which include buildings, medians, or other obstructions which makes placing the electrodes accurately difficult. The inaccurate placement of electrodes leads to errors in the mathematical calculations required to analyze the locations of the anomalies and therefore reduces the overall efficiency and accuracy of the system.

Moreover, the state of the art does not provide for interchangeability of sensors. This limitation requires extensive time in installation and replacement of defective sensors. The uniqueness of sensors required by the prior art creates a need for specific sensors uniquely identified by their order in a specific grid.

Further, a need exists for accurate measurement of voltage offsets to accurately calibrate voltage readings among sensors.

SUMMARY OF THE INVENTION

Soil, rocks, and vegetative matter can conduct electricity to varying degrees. The resistance, or resistivity, of these materials to an electrical current will vary depending upon density, particle composition, moisture content, and the chemical composition of fluid in the spaces between the particles. A fluid leak from, for example, pipes in a slab or a waste conduit or water main under a paved roadway into the subjacent soil will affect the electrical resistivity (resistance offered by a material to the flow of electrical current, multiplied by the cross-sectional area of current flow and per length of current path). Fluid generally decreases the resistivity of the subgrade. Measuring resistivity at varying depths and at varying locations, both beneath and adjacent to a slab foundation or paved roadway, and comparing these resistivities to one another, allows one the location of soil anomalies based on resistivity variations. These anomalies can include wet soil, vegetative matter and buried metallic and non-metallic objects. Research has shown that the location of resistivity anomalies corresponds well to the location of soil anomalies.

Resistivity is generally not measured directly; however, resistivity can be computed if the intensity of a current injected into the ground, and the resulting potential difference established between measurement electrodes are measured. These quantities depend on the geometry of the electric field, the nature of the soil and interstitial fluid, and the method used to measure the injected current and the resulting potential difference.

The preferred embodiment contemplates converting the measured potential to a resistivity value, assigning the resistivity value to a spatial coordinate, and storing these values in a computer file. A computer program then performs a least squares data inversion analysis on the resistivity and location values, creating an electrical resistivity model that minimizes the error of the field data. Next, another computer program performs a spatial data analysis, or geostatistical analysis, using kriging or other methods.

The preferred embodiment provides for a method and apparatus for impressing current into the ground and gathering resistivity data from a set of voltage control units that operate independently of one another but in synchronization with one another to carry out a sequence of geophysical resistivity tests. The preferred embodiment also provides for synchronous transmittal of test results from a test taken by said set of voltage control units to a data processor for creating 2-D and 3-D graphical representations of areas of equipotential resistivity, the test results being transmitted after every test to the data processor.

The preferred embodiment provides for an apparatus and method for controlling the amplitude of injected current with a power distribution unit, the current being ramped up and down during the sequence of geophysical test in order to preserve power source battery charge and to ensure like current and voltage conditions for each measurement. The preferred embodiment of the power distribution unit also causes voltage control unit operating power to be drawn from stored capacitive energy alone during a measurement for creating minimal electrical noise in the system. A novel design for a solid state relay switch is taught whereby the injected current is connected through at least two electrodes in such a way as to avoid the need to draw system power during the measurement and whereby the measurement noise is reduced over prior art methods.

The preferred embodiment provides for a method of deployment of voltage control units wherein each voltage control unit incorporates a self-test sequence during deployment so that faulty units may be identified early in the deployment process. The deployment process is a manual process in the preferred embodiment, wherein electrodes are first surveyed and placed, the distances and positions of electrodes with respect to each other being recorded manually, after which the set of voltage control units are connected one to another in sequence from the power distribution unit and proceeding downstream, the subsequent registration of a voltage control unit causing a self-test on that voltage control unit to begin operation. The self-test sequence on a given voltage control unit includes the steps of creating a random address for the voltage control unit under self-test and for verifying the validity of the random address by communications with an upstream voltage control unit.

In another aspect of the invention, the control processor can identify and transmit instructions to manage current distribution, data and voltage measurements data at each sensor.

In the event of damage to a sensor or damage to an interconnecting cable, a replacement sensor or cable may be added to the array of sensors without excessive downtime and expensive field repairs because all of the sensors are identical. The replacement sensor can unambiguously identify itself with respect to other sensors to the control processor for use by the mapping software.

BRIEF DESCRIPTION OF THE DRAWINGS

For a more complete understanding of the preferred embodiment, and for further details and advantages thereof, reference is now made to the following Detailed Description taken in conjunction with the accompanying drawings, in which.

DETAILED DESCRIPTION

Figure 1A:
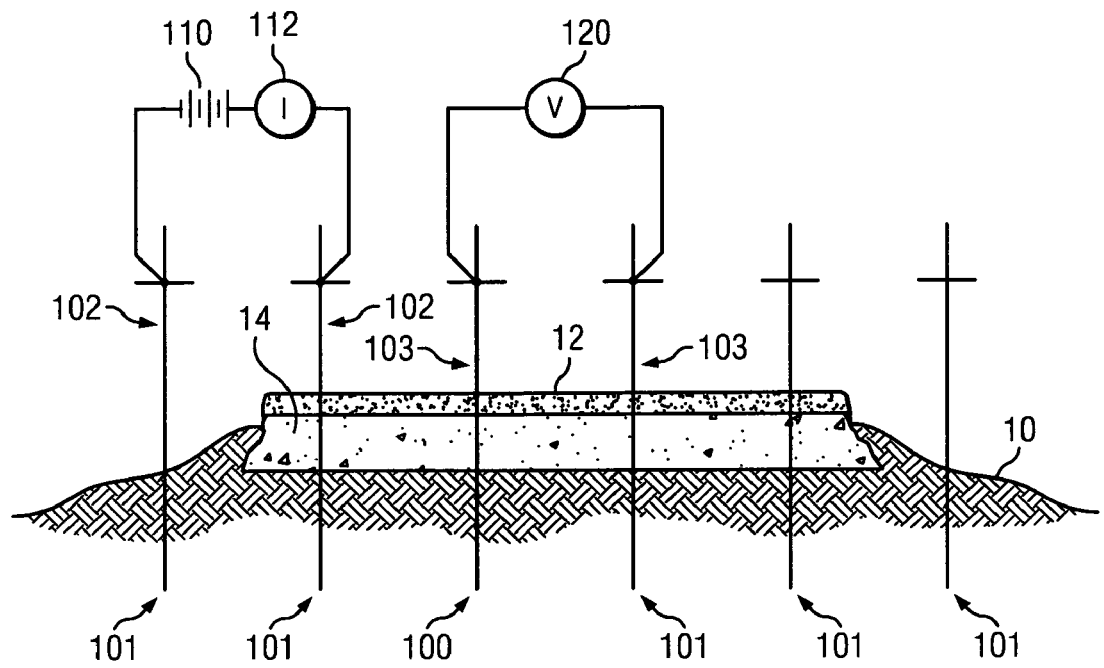
FIG. 1a is a schematic diagram of the injection of current into the ground through existing pavement and the monitoring of a resulting voltage.

A schematic diagram of the theory used to gather data as used in the preferred embodiment is shown in FIG. 1a. A series of electrodes 101 are inserted, typically in a line, into ground 10. FIG. 1 shows the preferred embodiment as applied to an asphalt paved roadway. Asphalt layer 12 is applied on top of mid-level layer 14. Adhering to typical road construction principles, mid-level layer 14 may be a layer of concrete, steel reinforced concrete, or a compacted layer of gravel. In some situations, asphalt layer 12 may not be present. Electrodes 101 are inserted through both asphalt layer 12 and mid-level layer 14 and into ground 10 in order to determine resistivity and to map and detect subsurface soil anomalies under the roadway. The locations of electrodes 101 are typically in a regular pattern with a known interstitial distance between each electrode. In most situations, the known interstitial distance ranges from 6 to 10 feet and an equal interstitial distance is used between each linear array. In some situations, it may be necessary to locate certain electrodes in a non-linear pattern to accommodate obstructions. For example, it may be necessary to avoid a latticework of steel rebar. One electrode, ground electrode 100, may not be in the regular pattern of electrodes 101, ground electrode 100 supplying a known earth ground reference point from which an electric potential difference V is measured.

Figure 1B:
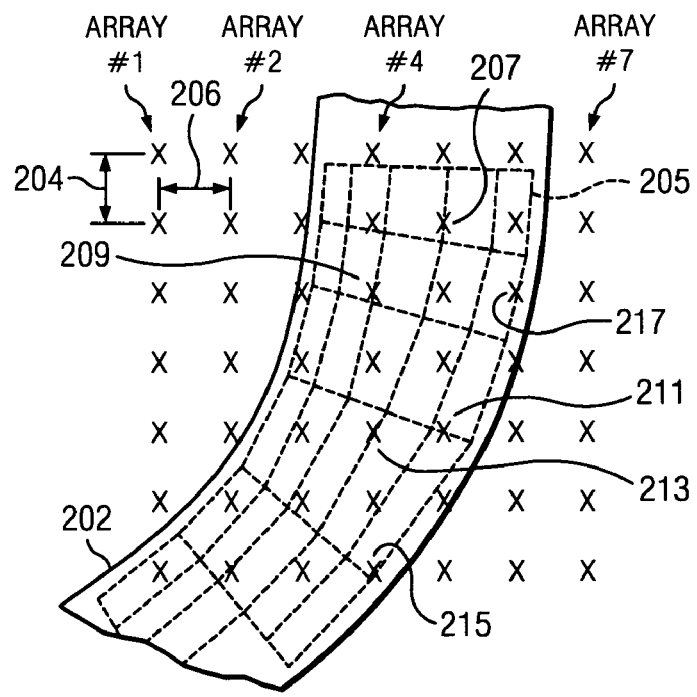
FIG. 1b is a schematic diagram of an electrode array.

Several arrays of electrodes are shown in FIG. 1b. Road section 202 is shown with a linear grid of arrays. Each "X" indicates the location of electrodes 101. The known interstitial distance between electrodes 204 is equal to the known interstitial distance between arrays 206. FIG. 1b also shows a schematic representation of latticework of steel rebar 205 encapsulated in the concrete surface of the roadbed. It should be noted that the typical regular array of electrodes interferes with the latticework of steel rebar at electrode locations 207, 209, 211, 213, 215 and 217, known as "interference points".

In practice, an array of electrodes such as shown in FIG. 1b, is laid out in conjunction with a roadbed and its surrounding surface. Borings are made through the pavement and roadbed for placement of the electrodes. During the process of boring, interference points are determined by actual exposure of rebar or other electromagnetic means such as electromagnetic preferred embodiment or use of magnetometers. Once interference points are located, the electrode positions are changed to avoid the steel latticework. In practice, the electrode location is moved by at least one-one hundredth of the interstitial distance between adjacent electrodes. In a second technique, the electrodes which create interference points are eliminated from the array altogether.

Figure 2A:
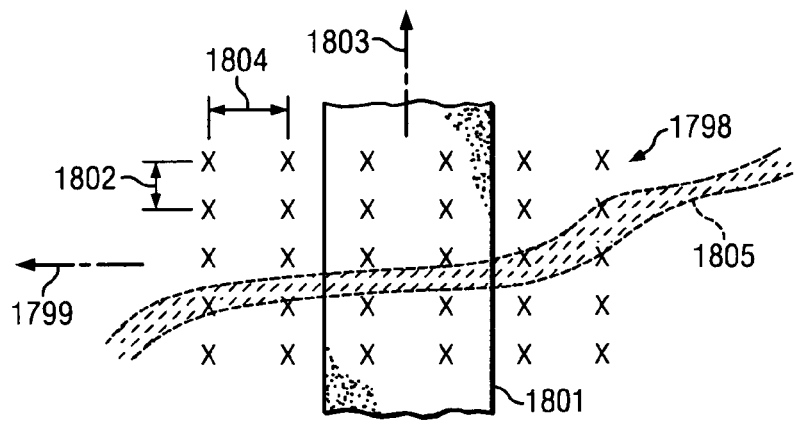
FIGS. 2a, b and c show a roadbed with various electrode array patterns
Figure 2B:
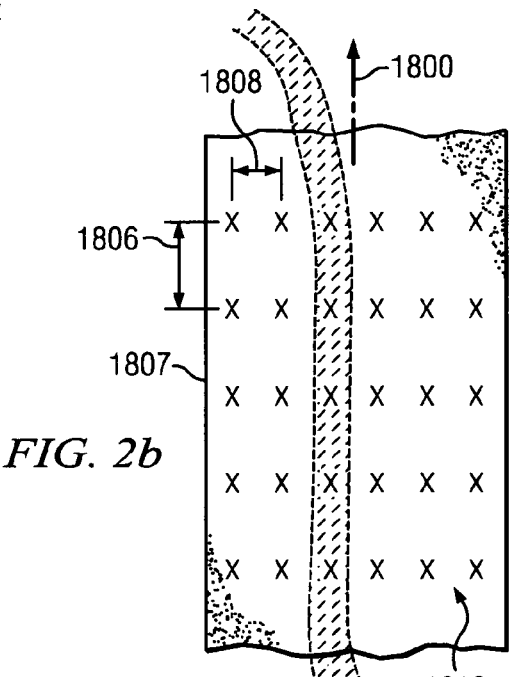
Figure 2C:
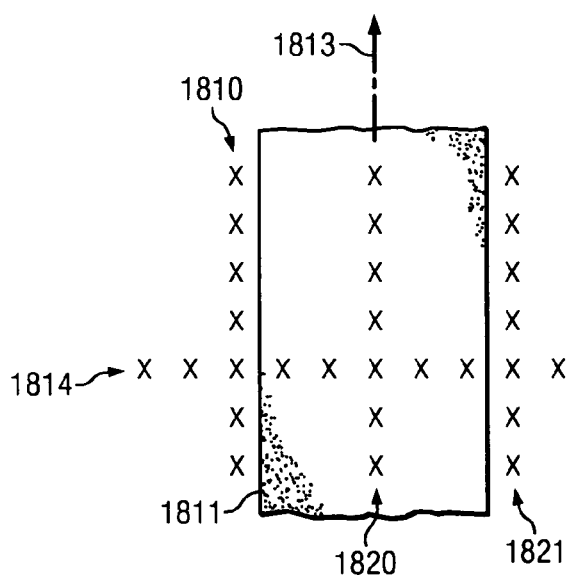

Referring to FIGS. 2a-2c, grid spacing alternatives are discussed. In large projects where many thousand of electrodes must be positioned, the spacing of the electrodes can be manipulated to achieve greater geographic coverage at the expense of accuracy. Three-dimensional data is produced by a two-dimensional rectangular grid pattern of electrodes. The ratio of "length" of the rectangular pattern to its "width" is known as the "aspect ratio" of the grid. For example, the aspect ratio of the rectangular pattern of FIG. 2a is "low" while the aspect ratio of the rectangular pattern of FIG. 2b is relatively "high". The precision of the measurement obtained is increased as the grid spacing is decreased; however, the time and expense required to deploy the electrodes at a decreased spacing can be considerable.

In certain situations, the grid spacing of electrodes must be compressed to adequately investigate subsurface anomalies. For example, when a roadbed includes a bridge or when a roadbed includes a known anomaly such as a submerged river, a compressed grid pattern across the longitudinal axis of the roadbed is recommended. FIG. 2a shows a grid 1798 where the interstitial distance between electrodes 1802 is comparatively less than the interstitial distance 1804 between electrodes. The ratio of interstitial distance 1802 to 1804 is the aspect ratio. An aspect ratio of between about 1/3 to about 1/10 can be used successfully to compress data in a desired direction to achieve increased precision.

FIG. 2a also depicts the use of a low aspect ratio grid pattern array across a roadbed to be useful in at least two situations. First, the low aspect ratio is useful observe a generalized anomaly 1805 that encounters a roadway 1801 having a generally longitudinal axis 1803. First, the axis of the anomaly 1799 is generally perpendicular to longitudinal axis 1803. The grid 1798 is positioned with respect to the axis of the array so that a greater distance along the anomaly is covered. Second, grid 1798 is used when subgrade points outside the roadbed are of interest with respect to the anomaly. In this example, the interstitial distance between electrodes 1802 may range between about 3 to about 30 feet.

FIG. 2b shows a grid pattern 1812 on a roadway 1807 having a longitudinal axis 1800 and an anomaly 1809 where the interstitial distance between electrodes 1806 is greater than the interstitial distance between arrays 1808. This grid pattern is of high aspect ratio. A high aspect ratio grid pattern may be used when the subsurface beneath roadway 1807 is the only interest. More roadbed can be mapped along longitudinal axis 1800 using a high aspect ratio arrangement. The high aspect ratio is about 3 to about 10. The interstitial distance between electrodes 1806 may be about 3 to about 30 feet. This type of grid pattern is also used when the terrain adjacent to the roadbed is difficult to map such as in the case of steep grades (a mountainside) or a manmade retaining wall (e.g., adjacent a bridge deck).

FIG. 2c shows a grid pattern using intersecting arrays on a roadway 1811 having longitudinal axis 1812. The use of two single-dimensional grids requires fewer electrodes and provides a faster setup time than a two-dimensional array covering a comparable area. For example, in situations where rapid deployment is required, or alternatively where it is expected that few anomalies will be located, two-dimensional grids are preferable. The axis of array 1810 is positioned adjacent to the roadbed and produces a two-dimensional representation of a plane adjacent the roadbed. The axis of array 1814 is generally perpendicular to the roadway and must be positioned by the use of holes through the roadway. Arrays 1820 and 1821 show alternate positions for two-dimensional arrays.

Referring again to FIG. 1, the first pair of electrodes 101 is connected to a DC or low frequency AC current source 110. This pair of electrodes is referred to as current electrodes 102. Current source 110 impresses a current into the ground through current electrodes 102. In series with current electrodes 102 and current source 110 is an ammeter 112. Ammeter 112 measures the current injected into the ground by current source 110. A second pair of electrodes, voltage electrodes 103, are connected to a volt meter 120 in series between them. Volt meter 120 measures the potential difference across voltage electrodes 103 created by the current impressed into the ground by current source 110 through current electrodes 102. One of the voltage electrodes 103 is the ground electrode 100, the other electrode being one of the electrodes 101 in the array.

In order to create a complete resistivity map, the voltage must be obtained at every possible permutation of electrodes in the array. Moreover, in order to obtain a complete resistivity map, the current source must be also moved to every possible permutation of electrodes.

Figure 3A:
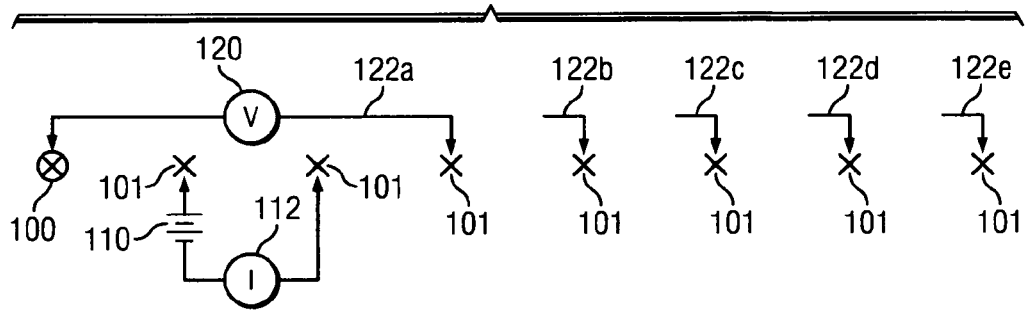
FIGS. 3a-3f are schematic diagrams of a series of permutations of the locations of an ammeter and a current source and a volt meter as employed by one preferred embodiment.

For example, FIGS. 3a-3f show, schematically, one method envisioned by the preferred embodiment for obtaining a resistivity map by various permutations of the position of current source 110 and volt meter 120. In FIG. 3a, ammeter 112 and current source 110 are connected to the first and second electrodes 101. Volt meter 120 is connected to ground electrode 100 and to the third electrodes in position 122a. Readings are then taken as will be fully described later. While the volt meter remains connected to the ground electrode 100, it is also connected to the fourth, fifth, sixth and seventh electrodes in order (122b, 122c, 122d and 122e, respectively) and readings are taken at each connection.

Figure 3B:
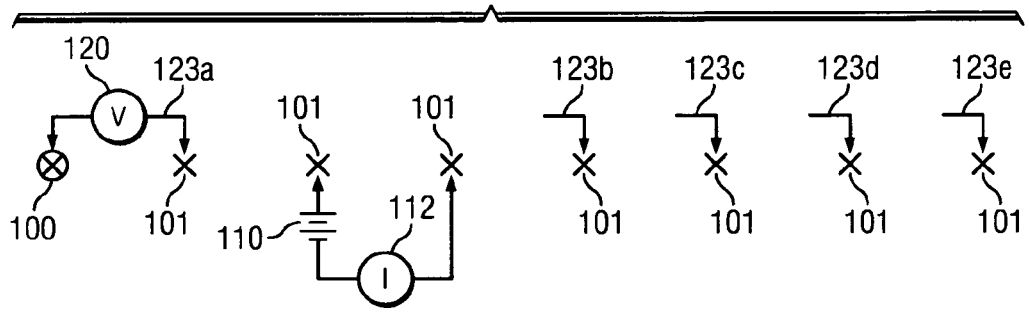

FIG. 3b shows the ammeter and current source being moved to a second position between the second and third electrodes. The volt meter is then connected between the ground electrode 100 and first electrode 101 in position 123a. It is then connected to the fourth, fifth, sixth and seventh electrodes in the array shown at positions 123b, 123c, 123d and 123e, respectively. Readings are taken at each connection of the volt meter.

Figure 3C:
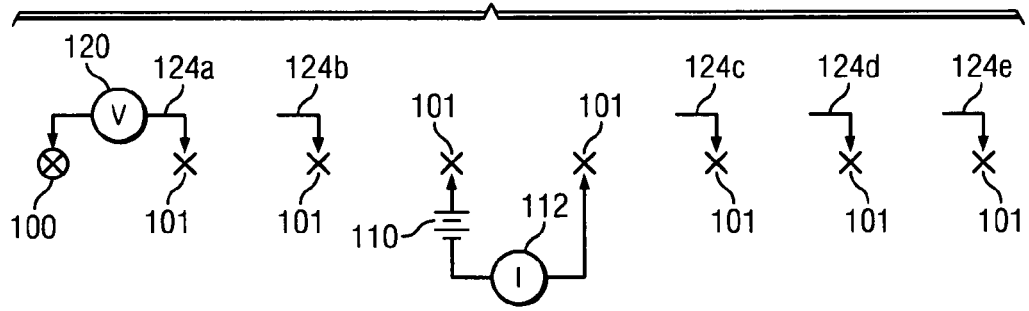

FIG. 3c shows the ammeter and current source being moved to a third position between the third and fourth electrodes. The volt meter is connected between the ground electrode 100 and first electrode 101 in position 124a. It is then connected to the second, fifth, sixth and seventh electrodes in the array shown at positions 124b, 124c, 124d and 124e, respectively. Readings are taken at each connection of the volt meter.

Figure 3D:
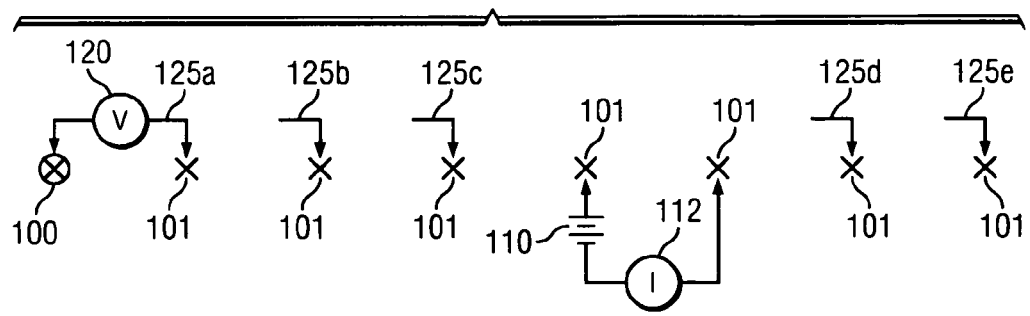

FIG. 3d shows the ammeter and current source being moved to a fourth position between the fourth and fifth electrodes. The volt meter is connected between the ground electrode 100 and first electrode 101 in position 125a. It is then connected to the second, third, sixth and seventh electrodes in the array shown at positions 125b, 125c, 125d and 125e, respectively. Readings are taken at each connection of the volt meter.

Figure 3E:
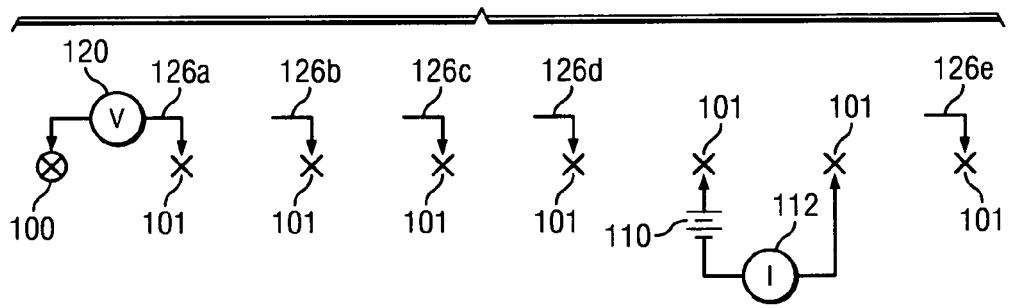

FIG. 3e shows the ammeter and current source being moved to a fifth position between the fifth and sixth electrodes. The volt meter is connected between the ground electrode 100 and first electrode 101 in position 126a. It is then connected to the second, third, fourth and seventh electrodes in the array shown at positions 126b, 126c, 126d and 126e, respectively. Readings are taken at each connection of the volt meter.

Figure 3F:
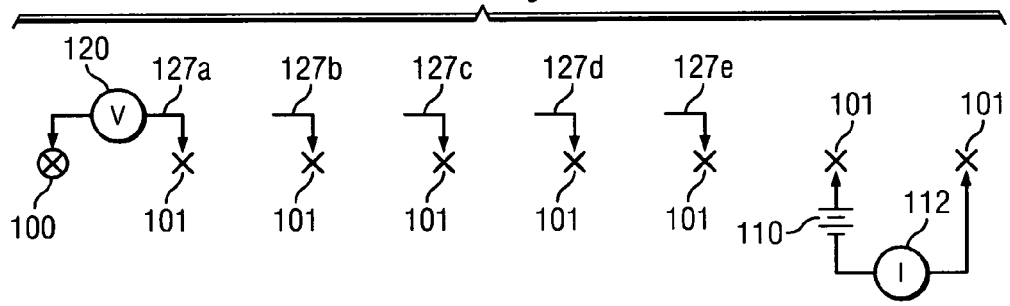

FIG. 3f shows the ammeter and current source being moved to a sixth position between the sixth and seventh electrodes. The volt meter is connected between the ground electrode 100 and first electrode 101 in position 127a. It is then connected to the second, third, fourth and fifth electrodes in the array shown at positions 127b, 127c, 127d and 127e, respectively. Readings are taken at each connection of the volt meter.

Other permutations of connections for injecting current and taking voltage readings between an array of electrodes are envisioned by the preferred embodiment. Those skilled in the art will recognize that the current can be injected at many different locations in a given array, not only those shown in FIGS. 3a, 3b, 3c, 3d, 3e and 3f. All possible permutations are also envisioned as embodiments of this preferred embodiment.

Figure 4:
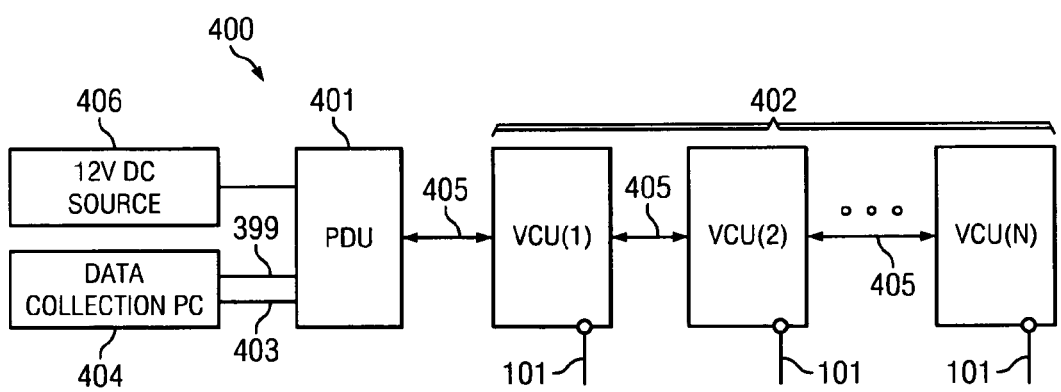
FIG. 4 is a schematic diagram of one preferred embodiment.

Continuing to FIG. 4, a schematic diagram is shown of the novel system of the preferred embodiment which allows for an array of nodes to dynamically reconfigure itself to impress current and take voltage readings in an array of electrodes. System 400 includes a power distribution unit (PDU) 401, and a set of voltage control units (VCU) 402 comprised of N VCUs arranged in a serial chain such that VCU(1) is connected to PDU 401, VCU(2) is connected to VCU(1), VCU(3) is connected to VCU(2) and so on until VCU(N) is connected to the end of the serial chain, N being equivalent to the number of VCUs in the set of VCUs 402. The VCUs in the set of VCUs 402 are connected to one another by a set of eight-conductor flexible cables 405. Each VCU in the set of VCUs 402 has an electrode 101 to which it may supply a current at high voltage, return a current from another high voltage source, or measure an electric potential. VCU(1) is referenced as the "head electrode" or "pole position" and VCU(N) is referenced as the "tail VCU" herein.

System 400 includes a data collection PC 404 with a data connection 403 between PDU 401 and data collection PC 404. Data collection PC 404 is typically a Pentium class laptop personal computer running an operating system such as Windows. Data collection PC 404 is powered via the PDU 401. Since system 400 is typically deployed in a remote area, it is helpful to have a power source for data collection PC 404. Power connection 399 between data collection PC 404 and PDU 401 provides for DC power for data collection PC 404.

A bi-directional communications link is provided between PDU 401 and the set of VCUs 402. In the preferred embodiment, the bidirectional communications links utilize two conductors in the set of eight-conductor flexible cables 405. With the data connection 403, the bidirectional communications link establishes a communications channel between each VCU in the set of VCUs 402, PDU 401 and the data collection PC 404.

PDU 401 provides a 12V DC battery 406 which serves as the current source for all other functions of the system 400. Alternate embodiments include multiple DC Batteries or AC-to-DC converters. In the preferred embodiment the 12V DC battery 406 is 12V deep cycle marine battery capable of storing 160 amp-hours of cranking time at approximately 20 amps.

In the preferred embodiment, a VCU is an intelligent node which has the capability to run tests independently of other VCUs in the system 400. The data collection PC 404 is used to select a particular test configuration, to assimilate the data as it is sent from the VCUs as they run tests, and to process the assimilated data.

Figure 5:
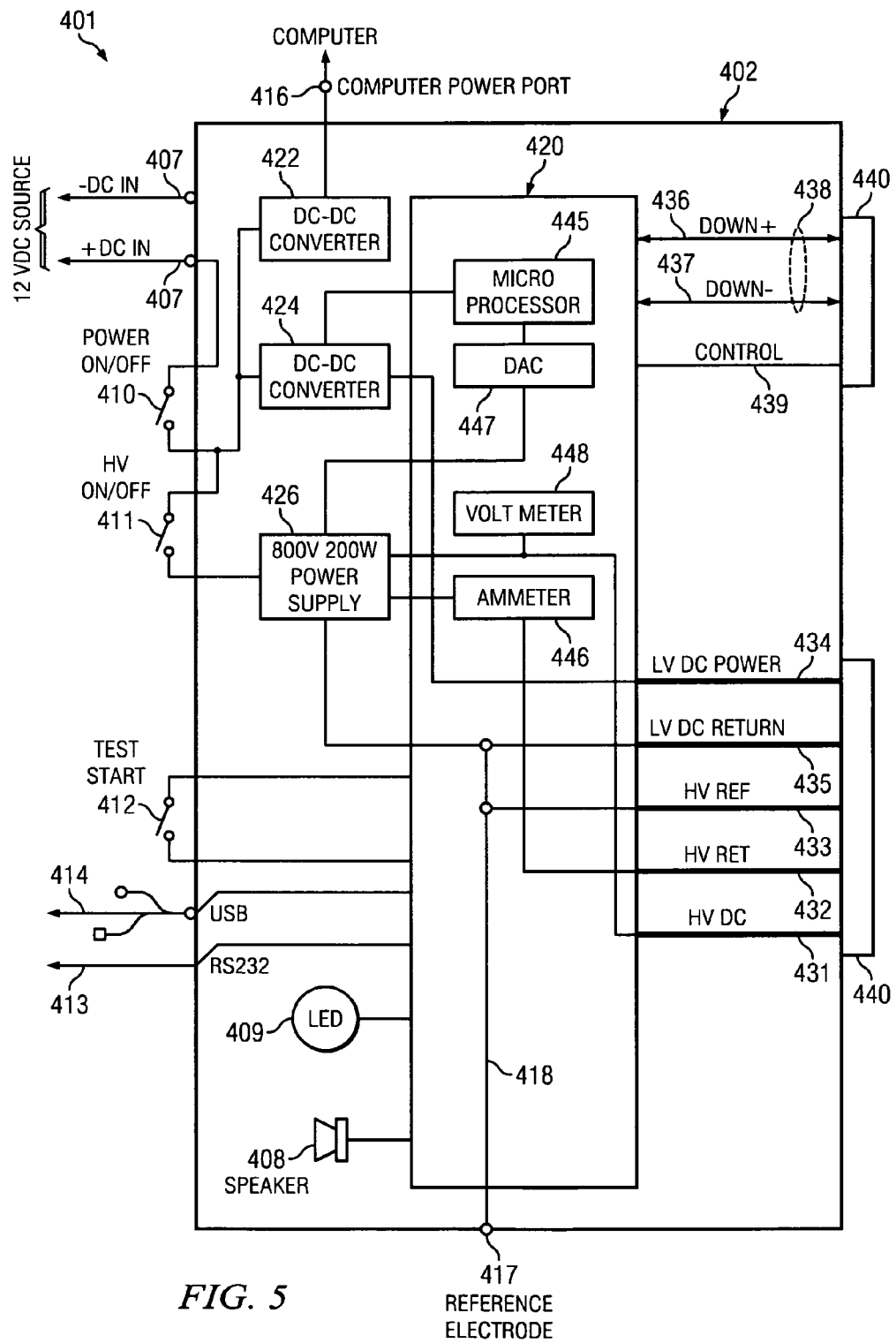
FIG. 5 is a schematic diagram of a power distribution unit for controlling the current supplied to electrodes and for controlling the operating power for other system components.

Referring to FIG. 5, a diagram of the construction of a PDU 401 is shown. PDU 401 is a power distribution unit containing power distribution electronics 420 for carrying out the logic functions for PDU 401. PDU 401 has three power converters/supplies, a first DC-DC converter 422, a second DC-DC converter 424 and a high voltage (HV) power supply 426; the output voltage lines of second DC-DC converter 424 and HV power supply 426 being connected into power distribution electronics 420 for further control.

PDU 401 has number of power supply related connections, namely DC power connector 407 which connects 12V DC battery 406 to the power converters/supplies, main on/off switch 410 which connects 12V DC power between DC power connector 407 and the power converters/supplies, HV on/off switch 411 which connects 12V DC power between the HV power supply and the main on/off switch 410, HV reference port 417 for connecting ground electrode 100 to system 400, and computer power port 416 which provides a port for connecting power between first DC-DC converter 422 and data collection PC 404. Note that ground electrode 100 may be placed at a location physically remote from PDU 401 and connected by a single conductor cable to HV reference port 417.

Continuing with input/output and control connections, PDU 401 has test start switch 412 which connects to power distribution electronics 420 for initiating a sequence of tests similar to the sequence of tests illustrated in FIGS. 3a-3f; a USB port 414 also connected to power distribution electronics 420 for connecting PDU 401 to a USB port on data collection PC 404; a RS-232 port 413 also connected to power distribution electronics 420 for alternatively connecting PDU 401 to an RS-232 port on data collection PC 404; LED 409 connected to power distribution electronics 420 for visually signaling a system 400 state of operation; speaker 408 connected to power distribution electronics 420 for audibly signaling a system 400 state of operation; RS-485 communications link 438 for communicating downstream to set of VCUs 402 further comprised of a set of physical wires, "down+" wire 436 and "down−" wire 437 wherein RS-485 communications link 438 is connected and controlled by power distribution electronics 420; and control line 439 connected to power distribution electronics 420 used for controlling test functions.

PDU 401 functions to control a set of output power lines, HV DC power 431, HV RET 432, HV REF 433, LV DC power 434 and LV DC return 435 for powering the set of VCUs and for providing HV current for tests. The set of power lines, control line 439, "down+" wire 436 and "down−" wire 437 are connected to set of VCUs 402 by an output connector 440 which is further connected to one of 8-conductor flexible cables 405. Table 1 is a list of signals being carried on the eight conductor flexible cable 405 in the preferred embodiment.

TABLE 1

Flexible cable specifications

| Wire | Signal | MAX DC Voltage | Current | Gauge | Stranding |
|---|---|---|---|---|---|
| 1 | HV DC Power 431 | 800 | 2 A | 22 | 19 × 34 |
| 2 | HV RET 432 | 800 | 2 A | 22 | 19 × 34 |
| 3 | HV REF 433 | 0 | 0 | 22 | 19 × 34 |
| 4 | LV DC power 434 | 48 | 2 A | 22 | 19 × 34 |
| 5 | LV DC return 435 (Gnd) | 48 | 2 A | 22 | 19 × 34 |
| 6 | COM+ (up/down+) | 3.3 | 100 mA | 22 | 19 × 34 |
| 7 | COM− (up/down−) | 3.3 | 100 mA | 22 | 19 × 34 |
| 8 | Control line 439 | 3.3 | 100 mA | 22 | 19 × 34 |

Power distribution electronics 420 contains a microprocessor 445, an ammeter 446, a digital to analog converter, DAC 447, and a voltmeter 448. Microprocessor 445 executes a pre-defined set of instructions to control the functions of HV power supply 426, second DC-DC converter 424, ammeter 446, voltmeter 448, test start switch 412, LED 409, speaker 408 and to aid in communications between VCUs 402 and data collection PC 404. In particular for communications, power distribution electronics 420 generates "down+" wire 436 and "down−" wire 437, "down+" wire 436 and "down−" wire 437 forming half-duplex differential RS-485 communications link 438 according to the TIA-485-A standard. Microprocessor 445 also translates signals to and from RS-485 communications link 438 to and from USB port 414 so that the set of VCUs 402 may communicate to and from data collection PC 404 using RS-485 communications link 438. Power distribution electronics 420 also translates RS-485 communications link 438 to and from RS-232 port 413 which optionally provides a channel between RS-485 communications link 438 and data collection PC 404.

Microprocessor 445 connects to second DC-DC converter 424 so that LV DC power 434 is controlled independently of main on/off switch 410. Microprocessor 445 also connects to DAC 447 so that control of HV power supply 426 is accomplished whereby any set voltage between zero and the maximum output of HV power supply 426 is output to HV DC power 431.

Ammeter 446 is connected between HV power supply 426 and HV RET 432 so as to measure the current being delivered to system 400 current electrodes 102. Ammeter 446 is connected to and read by microprocessor 445 so that current measurements may be sent to data collection PC 404 in relation to a test.

Voltmeter 448 is connected to HV DC power 431 and to microprocessor 445. Microprocessor 445 measures the output voltage of HV power supply 426, for proportional control of HV DC power 431 and for test purposes. Microprocessor 445 measures voltage of LV DC power 434 in order to check the charge condition of 12V DC battery 406. HV reference port 417, HV REF 433, and HV power supply 426 ground are connected together at line 418 to a reference ground point defined by the position of ground electrode 100 connected to HV reference port 417. Additionally, line 418 is connected to 12V DC source negative input at DC power connector 407, to local ground for power distribution electronics 420 and to the ground outputs of DC-DC converters 422 and 424.

In the preferred embodiment the HV power supply is a 1C24-P250 from UltraVolt, Inc. with a maximum output voltage of 800V and a current limit of 2 A.

Figure 6:
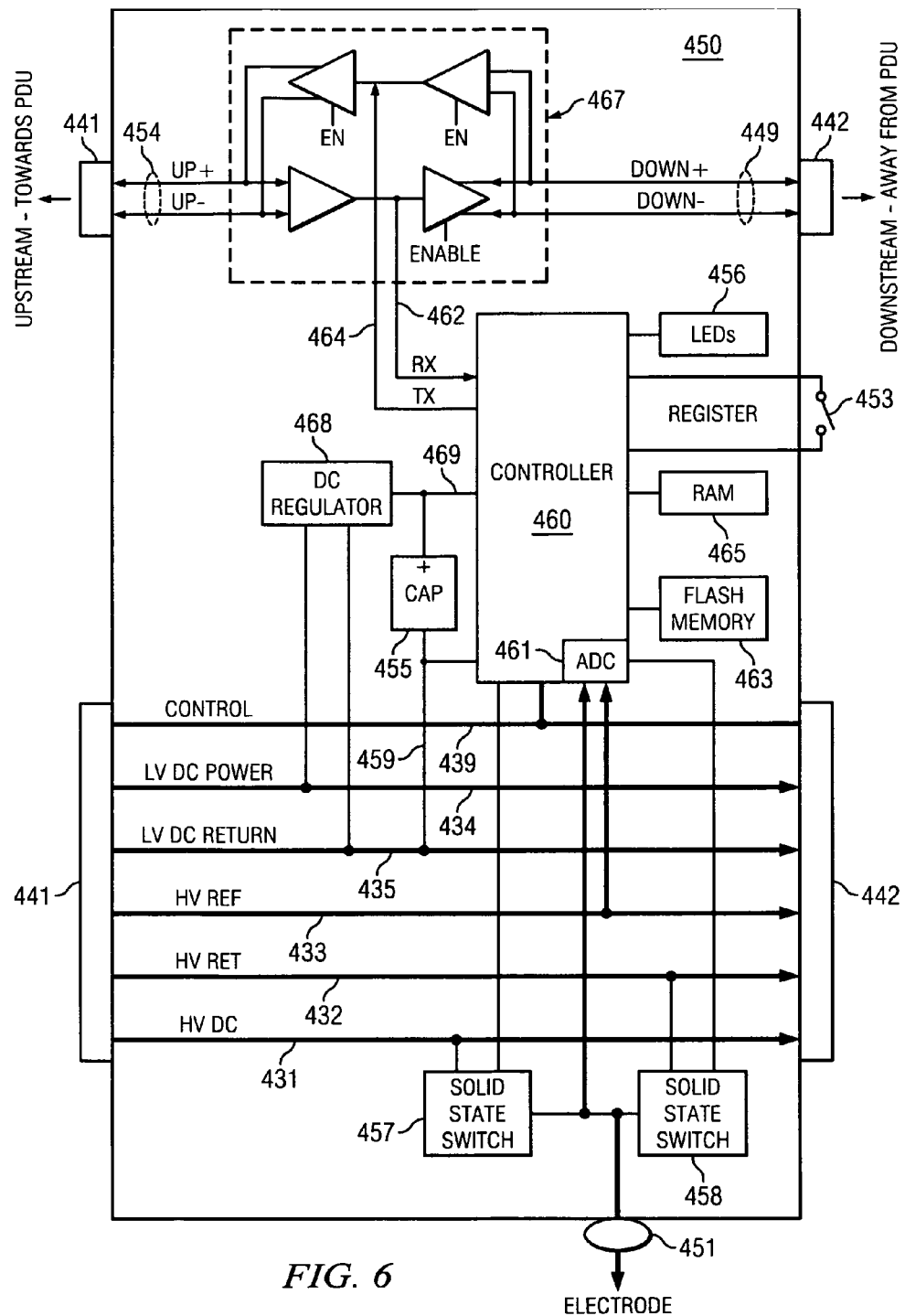
FIG. 6 is a schematic diagram of a voltage control unit for gathering and transmitting measurement data from an electrode.

FIG. 6 is a block diagram of a VCU 450 in the set of VCUs 402. The VCUs in the set of VCUs 402 are identical to VCU 450. VCU 450 is connected to electrode 451 for impressing or returning a high voltage current or for measuring an electric potential. VCU 450 has upstream connector 441 for connecting power and RS-485 communications signals to upstream VCUs and/or PDU 401 via eight-conductor flexible cable 405. For the purpose of description, "upstream connections" are shown in FIG. 4 as from right to left toward PDU 401. "Downstream connections" are shown in FIG. 4 from left to right away from PDU 401. VCU 450 has downstream connector 442 for connecting power and RS-485 communications signals to downstream VCUs via eight-conductor flexible cable 405. The six power signals from the upstream connector 441 are passed through to the downstream connector 442, the passed power signals being HV DC power 431, HV RET 432, HV REF 433, LV DC power 434, LV DC return 435, and control line 439.

Output connector 440, upstream connector 441, downstream connector 442 are Amphenol PT Series type connectors from Amphenol Corporation with service rating I, solder contact size 20 and shell size 12. A cable connecting receptacle, part number PT01J-12-8P003 from Amphenol, is used to terminate the eight-conductor flexible cables 405 and to plug into the connectors 440, 441 and 442. Of course, other connector systems may be employed.

VCU 450 has a microcontroller 460, having internal ROM and RAM 465 for storage in addition to flash memory 463. RAM 465 is volatile while flash memory 463 is non-volatile. VCU 450 performs controlling and processing functions which are stored as predefined programs in ROM. An analog-to-digital converter, ADC 461, is attached to and read by microcontroller 460. ADC 461 has inputs attached to electrode 101 and to HV REF 433. Microcontroller 460 is connected to a set of LEDs 456 which are powered on and off by microcontroller 460 as required, the set of LEDs having at least a red LED and a green LED. Microcontroller 460 is further connected to a set of RS-485 transceivers 467 via TX line 464 and RX line 462. VCU 450 has register button 453 which is connected to microcontroller 460 and used for registering VCU 450 in a system start-up process.

ADC 461 is integrated into microcontroller 460 in the preferred embodiment wherein microcontroller 460 is preferably model MSP430 from Texas Instruments. ADC 461 essentially measures the potential difference between electrode 101 and HV REF 433.

VCU 450 has a RS-485 transceiver 467 which is further comprised of two RS-485 transceiver ICs arranged in a back to back configuration suitable for regenerating pass-through RS-485 communication signals and for generating communication signals to and from the microcontroller 460. Set of RS-485 transceivers 467 drive the "up+" wire and "up−" wire of RS-485 communications link 454 connected to upstream connector 441 in addition to the "down+" wire and "down−" wire 449 of RS-485 communications link 454 connected to downstream connector 442. RS-485 communications link 454 to downstream connector 442. In the case of VCU(1), upstream connector 441 is connected by 8-conductor flexible cable 405 to output connector 440 of PDU 401. In all other cases upstream connector 441 of VCU(i) is connected by a 8-conductor flexible cable 405 to the downstream connector 442 of VCU(i−1) for i=2, . . . N. In all cases, the "up+" wire of VCU(i) connects to the "down+" wire of VCU(i−1) and similar for the "up−" and "down−" wires. Maxim model MAX3535E is a suitable RS-485 transceiver IC in the preferred embodiment.

LV DC power 434 is connected to the common input of DC regulator 468, the output of DC regulator 468 being connected to and providing regulated DC power 469 to microcontroller 460, RAM 465, flash memory 463, LEDs 456 and RS-485 transceiver 467 of VCU 450. Capacitor 455 is connected between ground at LV DC return 435 (by line 459) and regulated DC power 469. Capacitor 455 is charged while LV DC power 434 is on and applied. During test operations LV DC power 434 is purposely turned off to reduce system noise. VCU 450 operating by drawing power from energy stored in charged capacitor 455.

Solid state relays, first SSR 457 and second SSR 458, contained within VCU 450 are used to connect or disconnect high voltage signals to and from electrode 451. SSR 457 is connected to HV DC power 431 on one side and to electrode 451 on the other side, essentially opening and closing a current path between HV DC power 431 and electrode 451. Input control to SSR 457 is connected to microcontroller 460 which independently signals SSR 457 to open or close. SSR 458 is connected to HV RET 432 on one side and to electrode 451 on the other side, essentially opening and closing a current path between HV RET 432 and electrode 451. Input control to SSR 458 is connected to microcontroller 460 which independently signals SSR 458 to open or close.

Figure 22A:
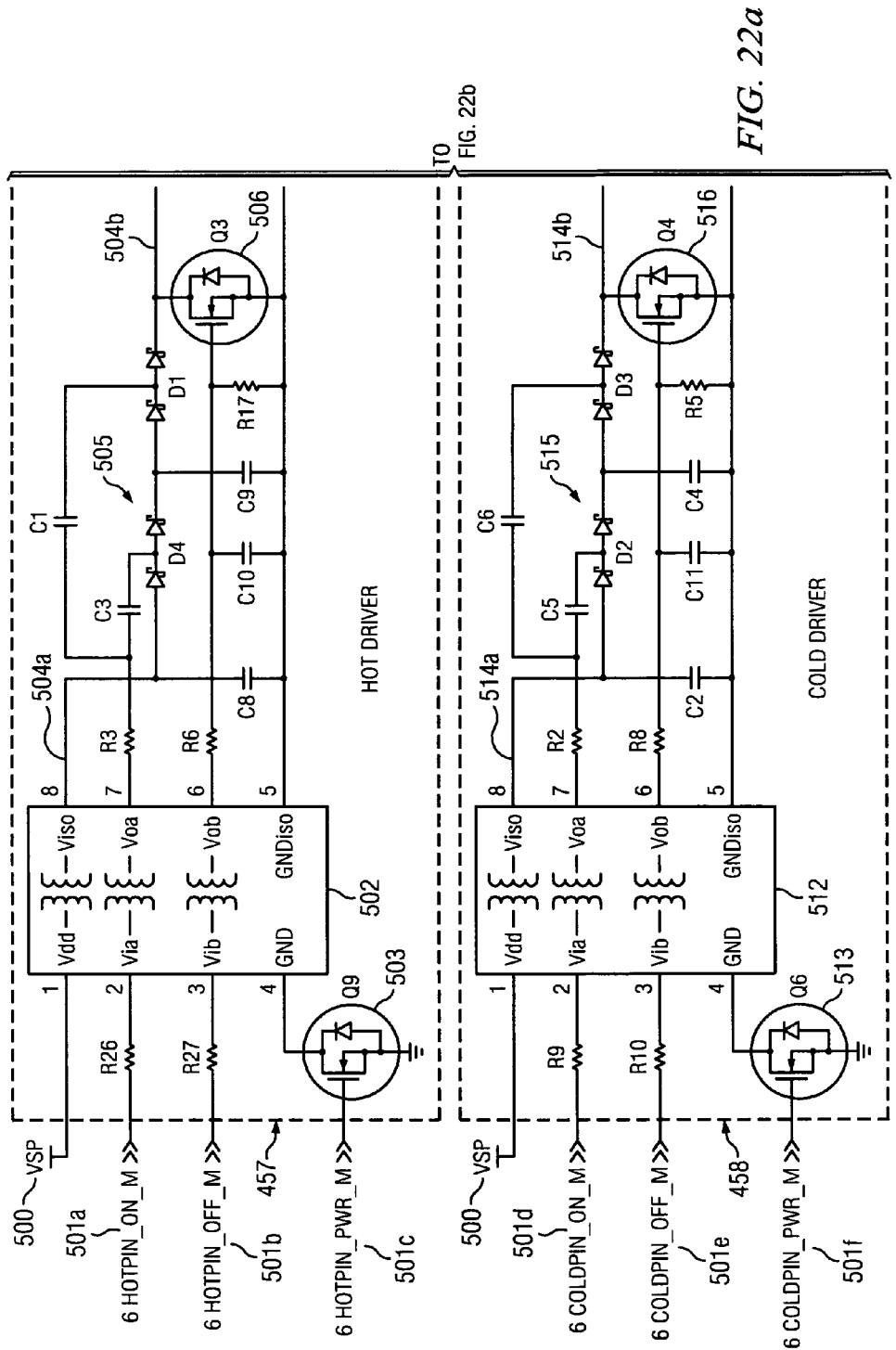
FIGS. 22a and 22b are circuit diagrams of a solid state relay switch in the preferred, embodiment of the voltage control unit.
Figure 22B:
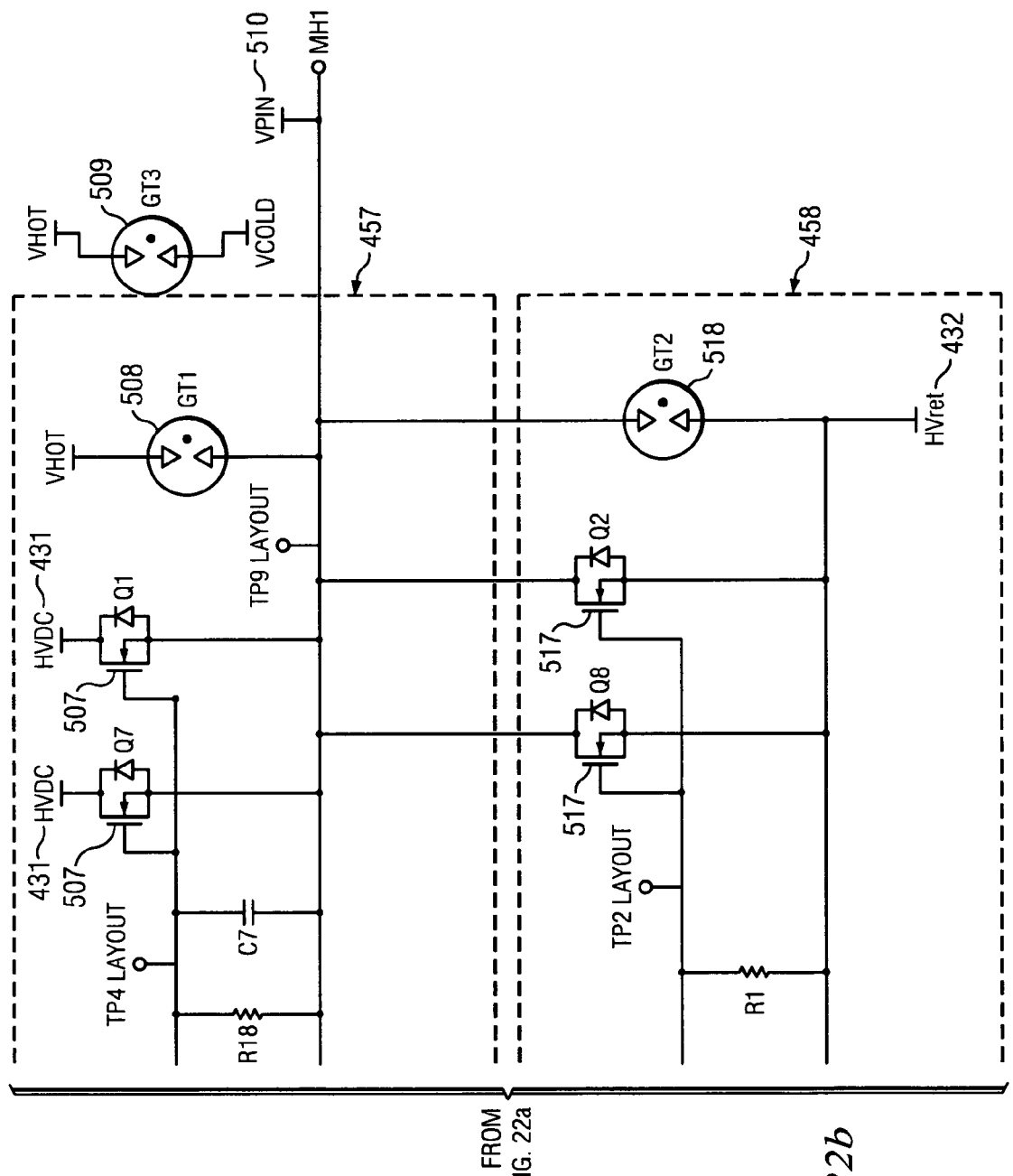

In FIGS. 22a and 22b, circuit diagrams of the preferred embodiment of the solid state relays SSR 457 and SSR 458 are shown. SSR 457 controls the delivery of positive high voltage from HV DC power 431 to VCU electrode 451 which is connected to the vpin output 510. SSR 457 circuit comprises isolation transformer 502, charge pump 505, transistor 506, transistor 503, transistor pair 507, transient surge protector 508 and transient surge protector 509; the transient surge protectors providing protection in the case of lightning. Isolation transformer 502 is powered from DC regulator 468 at Vdd pin 500 and grounded through GND pin of isolation transformer 502 in conjunction with transistor 503. Transistor 503 is connected to signal line 501c. Signals 501a, 501b and 501c from microcontroller 460 drive SSR 457 into various states: signal 501a is pulsed on/off at about 1 kHz rate when energized and drives SSR 457 into a conducting state wherein current from HV DC power 431 is delivered to vpin output 510 and VCU electrode 451; an "on" signal at signal 501b cancels the previous conducting state, disconnecting HV DC power 431 from vpin output 510 and VCU electrode 451; signal 501c is used to disconnect SSR 457 from power when SSR 457 is not being used thereby saving VCU system power.

Isolation transformer 502 isolates the signals 501a, 501b and 501c from SSR 457 and generates a regulated output voltage at 504a, the output voltage being 5V in the preferred embodiment. Charge pump 505 is connected to signal 501a through isolation transformer 502. Charge pump 505 is further connected to the regulated output voltage 504a. Charge pump 505 is a Dickson type charge pump comprised of capacitors C1, C3, C8, and C9 and diodes D1 and D4, the charge pump output voltage 504b being approximately 12V when the signal 501a is energized and the signal 501b is off. Resistors R3 and R6 are current limiters. Resistor R18 and capacitor C7 are connected so as to smooth output voltage 504b transient. When charge pump 505 is operating, the transistor pair 507 gates acquire a charge at 12V. At 12V, transistor pair 507 conducts causing HV DC power 431 to connect to vpin output 510. When charge pump 505 is subsequently turned off by turning signal 501a off, the charge on transistor pair 507 floats and remains so that they continue to conduct, the transistors being of low leakage MOSFET type. When signal 501b is turned on transistor 506 is made to conduct and discharges transistor pair 507 so that they no longer conduct. HV DC power 431 is then isolated from vpin output 510. Resistor R17 and capacitor C10 are connected to the input of transistor 506 to reduce transients on the input signal generated from signal 501b.

SSR 458 operates the same way as SSR 457 having input signals 501d, 501e and 501f similar to respective input signals 501a, 501b and 501c, but driven separately by microcontroller 460. SSR 458 comprises transistor 513, transformer 512, charge pump 515, transistor 516 transistor pair 517 tied to HV RET 432 and transient surge protector 518. Charge pump 515 is connected to isolated signal 501d through isolation transformer 512. Charge pump 515 is further connected to the regulated output voltage 514a. Charge pump 515 is comprised of capacitors C2, C4, C5, and C6 and diodes D2 and D3, the charge pump output voltage 514b being approximately 12V when the signal 501d is energized and the signal 501f is off. Resistors R2 and R8 are current limiters and the resistor R1 and capacitor C7 is connected so as to smooth the voltage 504b transient. When charge pump 515 is operating, the transistor pair 517 gates acquires a charge at 12V and the transistor pair 517 conducts further causing HV RET 432 to connect to vpin output 510. When charge pump 515 is subsequently turned off by turning signal 501d off, the charge on transistor pair 517 becomes floating and remains on the transistor pair 517 so that the transistors continue to conduct, the transistors being of low leakage MOSFET type. When signal 501e is turned on, transistor 516 is made to conduct and discharges transistor pair 517 so that they no longer conduct and HV RET 432 is then isolated from vpin output 510. Resistor R5 and capacitor C11 are connected to the input of transistor 516 to reduce transients on the input signal generated from signal 501e.

In the preferred embodiment isolation transformer is part number ADUM5240ARZ from Analog Devices; transistors 503, 506, 513 and 516 are type 2N7002; transistor pair 507 is IXTA3N120 from IXYS corporation; transient surge protectors 508, 509 and 518 are of type GTCA28-102k from Tyco Electronics; diodes D1, D2, D3 and D4 are Shottky-Barrier type transistors BAT54S from Fairchild Semiconductor.

SSR 457 and SSR 458 have the feature of latching into a conducting state for the duration of a test run without the need for further power consumption by working off of a floating charge. In the preferred embodiment, measurements may be made faster and with much less noise than in the prior art as each of the VCUs draws on locally stored capacitative power during a test run. The design of SSR 457 and SSR 458 enables such noise free operation.

Referring to FIG. 6, microcontroller 460 contains VCU software programs for executing test sequence instructions and for communicating with other system 400 components. VCU software programs are optionally recorded in ROM or may be stored in flash memory 463. One function of the VCU software programs is to operate on a test sequence table stored in RAM 465. The test sequence executes instructions that carry out a series of measurements including setting internal VCU connections to electrode 451. Test sequence tables are discussed further below.

Figure 7:
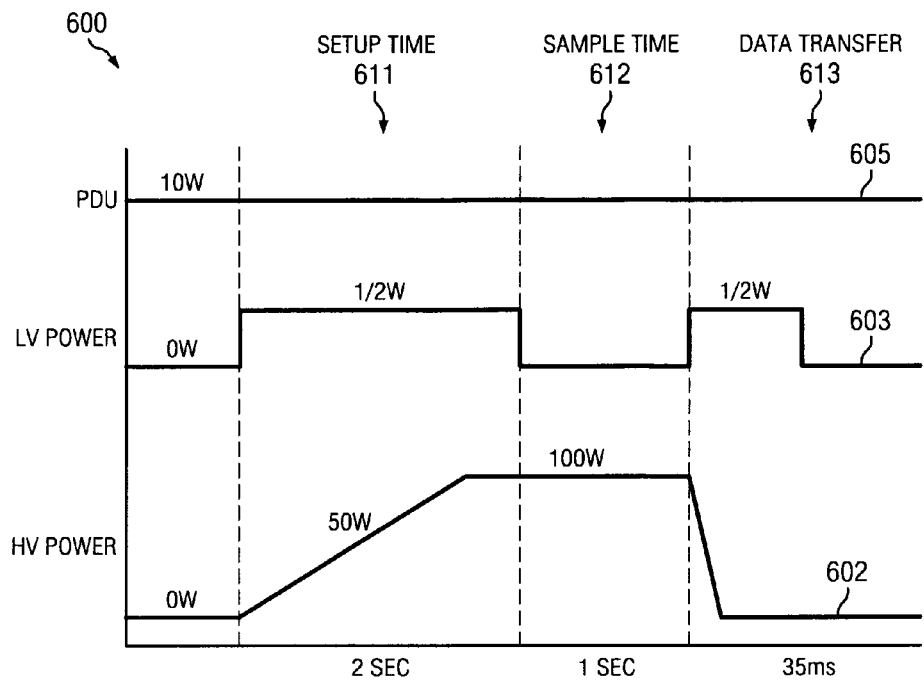
FIG. 7 is a resistivity test sequence power and timing diagram.

Since a 12 VDC battery is used as a current source for the tests accomplished with system 400, it becomes a finite resource. The preferred embodiment contemplates conservation of the finite resource in the tradeoff between the number of tests that can be completed in a given time and the power consumption per test. FIG. 7 is a graph 600 of power usage during a typical test cycle. Trace 602 is a trace of the HV DC power consumed by the electrodes in test. Trace 603 is a trace of the LV DC power consumed by the set of VCUs 402 during the same period. Trace 605 is a trace of the HV DC power consumed by PDU 401 including the data collection PC 404. Setup time 611 defines test setup time as the time it takes for the system to ramp up the high voltage on a given electrode from zero to a preset voltage limit. Sample time 612 is the sample time in which a VCU makes an electric potential measurement. Data transfer time 613 is the data transmit time which is the time required to transmit the electric potential measurement data from the VCU to the data collection PC 404. HV DC power 431 is powered down during a measurement. Test time for one test cycle is the sum of the setup time 611, sample time 612 and data transfer time 613 is provided by the following equation:

$$\text{Timecycle} = T\text{setup} + T\text{sample} + T\text{data}.$$

As an example, $$\text{Timecycle}_{typical} = 2 \text{ sec} + 1 \text{ sec} + 0.035 \text{ sec} = 3.035 \text{ sec}$$

The number of test cycles determined according to the equation:

$$\text{Testcycles} = \frac{[N \times (N+1)]}{2} \times \text{polarity}$$

where,
N is the number of VCUs in the set of VCUs 402, and
Polarity=the number of times that the polarity is switched (e.g., in the preferred embodiment, polarity=2 (positive and negative)).

The required battery ratings for different values of N are given in TABLE 2.

TABLE 2

Battery rating vs. number of tests.

| Battery AH rating | Number of VCUs | Number of test sequences on one charge | Total number of tests | Test sequence duration |
|---|---|---|---|---|
| 145 | 100 | 1 | 10100 | 8.5 |
| 100 | 80 | 1.1 | 6480 | 5.5 |
| 70 | 50 | 2.1 | 2550 | 2.1 |
| 20 | 30 | 1.8 | 930 | 0.8 |
| 10 | 16 | 3.1 | 272 | 0.2 |
| 5 | 8 | 5.9 | 72 | 0.1 |

Figure 8:
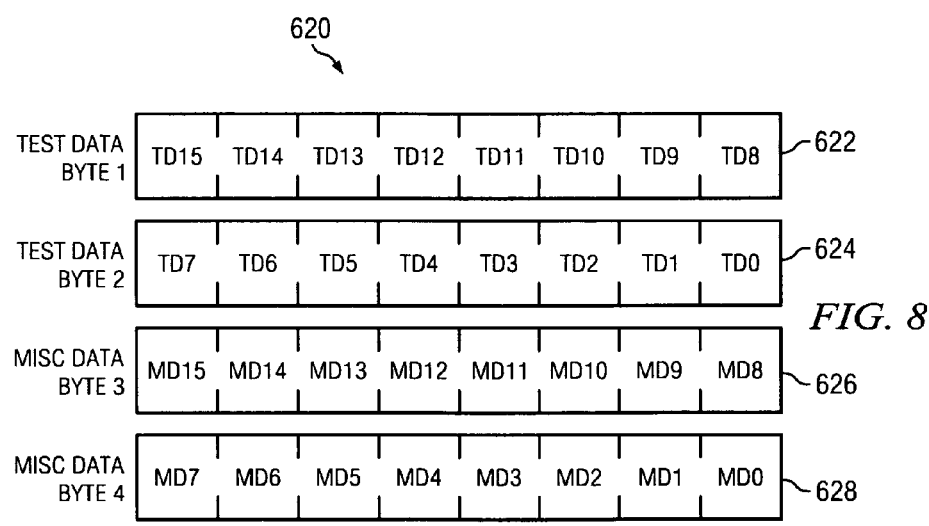
FIG. 8 is a diagram of showing the structure of a test data packet.

In the data communications between set of VCUs 402 and data collection PC 404, a data packet is transmitted at the end of a test cycle during data transfer time 613. FIG. 8 is a diagram of the data packet format 620 used in the preferred embodiment. A data packet is comprised of first test data byte 622, second test data byte 624, first miscellaneous data byte 626 and second miscellaneous data byte 628. The test data is transmitted as a 16-bit value contained in first test data byte 622 and second test data byte 624. The miscellaneous data bytes are designated for miscellaneous information, 2 bits of which are reserved for VCU version information. More than one 16-bit test data value may be taken during a test cycle when the environment is noisy, enough samples to reduce external measurement noise levels to an acceptable level. In most cases, disconnecting the LV DC power 434 from the VCU reduces measurement noise sufficiently.

Figures 9A, 9B:
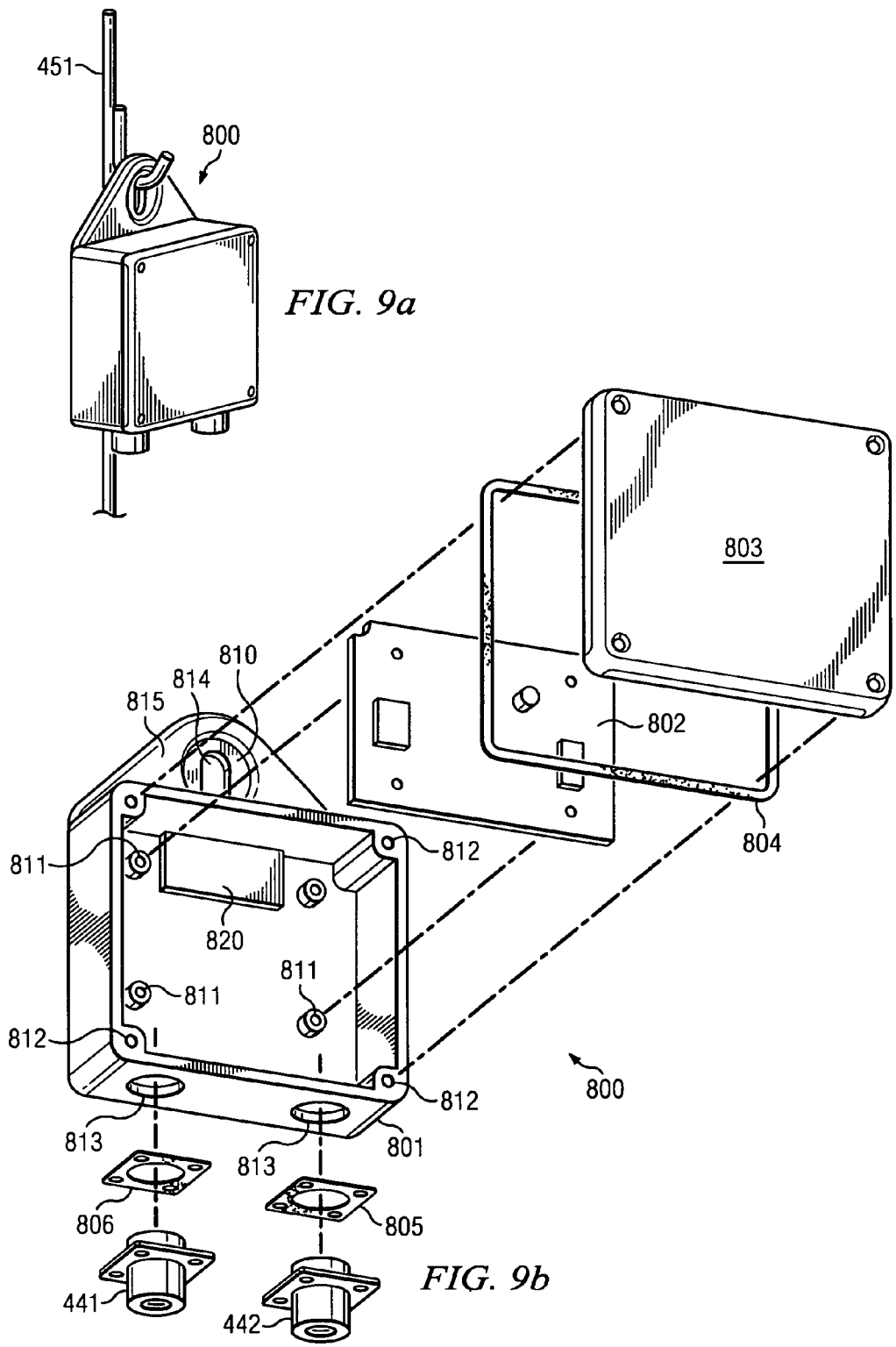
FIG. 9a is an isometric view of a voltage control unit of the preferred embodiment.
FIG. 9b is an exploded isometric view of a voltage control unit of the preferred embodiment.

FIGS. 9a and 9b show exploded isometric drawings of VCU 800 typical of the VCUs in set of VCUs 402. The mechanical components of VCU 800 comprise an injection molded enclosure 801 into which a stainless steel plate 820 is molded so that a steel surface exists on the outside of enclosure 801 for contacting electrode 451. Enclosure 801 has a cover 803 which secures to enclosure 801 with a set of screws inserted into a first set of molded holes 812 and compresses a rubber gasket 804 that prevents dust and moisture from entering enclosure 801. A circuit board 802 carrying electronic components for accomplishing the function of VCU 800 is attached to enclosure 801 by screws inserted into a second set of molded holes 811. Upstream connector 441 and downstream connector 442 are attached to enclosure 801 with screws inserted into a third set of holes 813: a connector gasket 805 placed between downstream connector 442 and enclosure 801; a connector gasket 806 placed between upstream connector 441 and enclosure 801. A permanent magnet 810 with a slot 814 is molded into a hanging tab 815 which is a molded feature to enclosure 801. Permanent magnet 810 aids in maintaining a solid electrical and mechanical connection between the stainless steel plate 820 of VCU 800 and the electrode 451 as shown in FIG. 9a.

Figure 10:
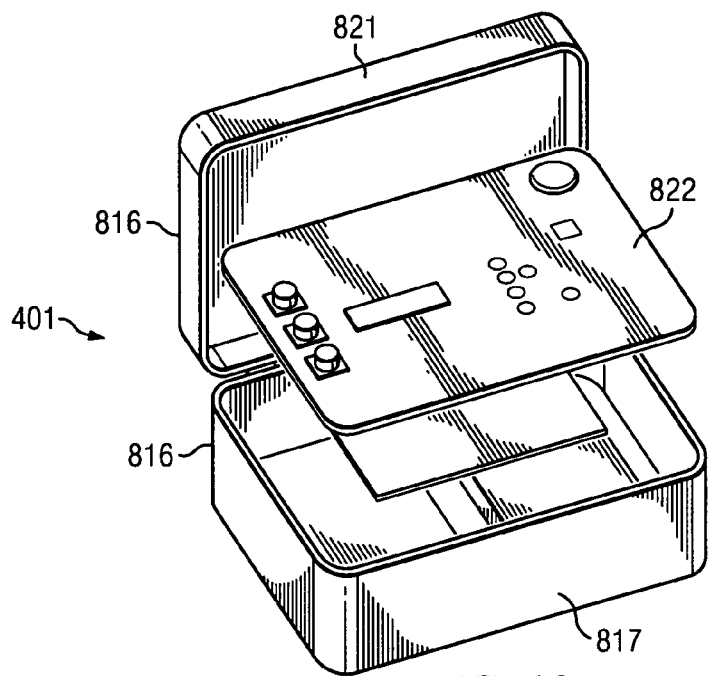
FIG. 10 is an exploded isometric view of a first embodiment of a power distribution unit.

FIG. 10 shows an exploded isometric drawing of PDU 401. PDU 401 has a first enclosure 816 comprised of PDU enclosure base 817 connected by a hinge to PDU enclosure lid 821. PDU 401 contains PDU circuit board 822 which further comprises the power distribution electronics 420, main on/off switch 410, HV on/off switch 411, test start switch 412, RS-232 port 413, USB port 414 and output connector 440. First DC-DC converter 422, second DC-DC converter 424 and HV power supply 426 are securely fastened beneath circuit board 822 to the PDU enclosure base 817. Circuit board 822 is fastened to first enclosure 816 just underneath PDU enclosure lid 821 so that a front panel interface is accessed upon opening PDU enclosure lid 821, the front panel interface allowing ease of access to main on/off switch 410, test start switch 412, RS-232 port 413, USB port 414, DC power connector 407, and computer power port 416. The 12V DC battery 406 is attached externally to the DC power connector 407 in the preferred embodiment. First enclosure 816 with enclosure base 817 and enclosure lid 821 is realized by Pelican model 1400 case purchased from Pelican Products Inc. in the preferred embodiment.

Figure 11:
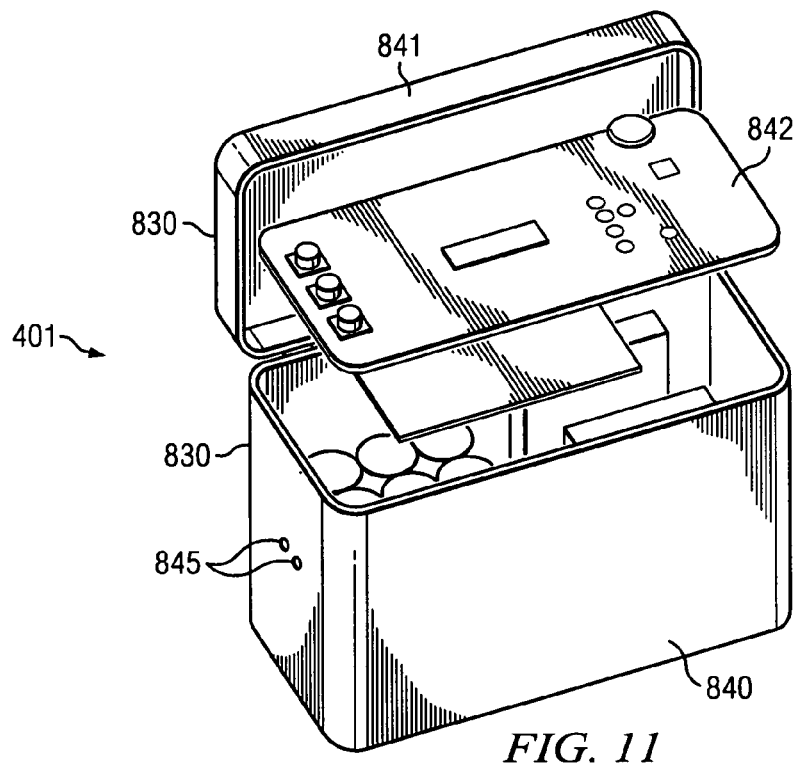
FIG. 11 is an exploded isometric view of a second embodiment of a power distribution unit.

In an alternate embodiment of the preferred embodiment, the DC battery is stored internal to PDU 401. FIG. 11 shows an exploded isometric drawing of PDU 401 for use with an integrated rechargeable DC battery. PDU 401 has second enclosure 830 comprised of second PDU enclosure base 840 connected by a hinge to second PDU enclosure lid 841. Second enclosure 830 contains PDU circuit board 842 which further comprises the power distribution electronics 420, main on/off switch 410, HV on/off switch 411, test start switch 412, RS-232 port 413, USB port 414 and output connector 440. 12V DC battery 406, first DC-DC converter 422, second DC-DC converter 424 and HV power supply 426 are securely fastened beneath circuit board 842 to the second PDU enclosure base 840. Circuit board 842 is fastened to second enclosure 830 just underneath second PDU enclosure lid 841 so that a front panel interface is accessed upon opening second PDU enclosure lid 841, the front panel interface allowing ease of access to HV on/off switch 411, test start switch 412, RS-232 port 413, USB port 414, DC power connector 407, and computer power port 416. 12V DC battery 406 is attached securely to second PDU enclosure base 840 and has an external recharging port 845 on the outside of second enclosure 830 for charging 12V DC battery 406. Second enclosure 830 with second PDU enclosure base 840 and second PDU enclosure lid 841 is realized by Pelican model 143 Top Loader Case purchased from Pelican Products Inc. in the preferred embodiment.

Figure 12:
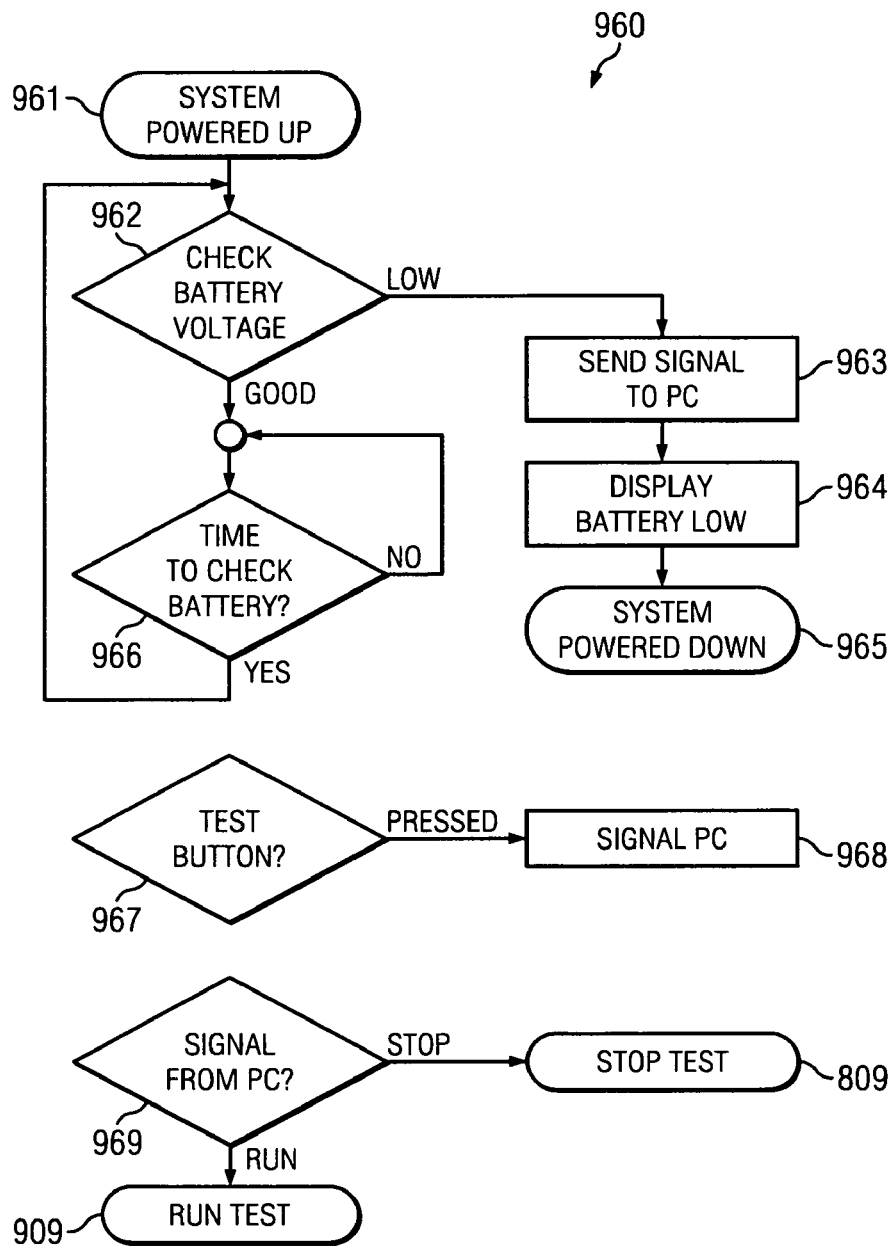
FIG. 12 is a flowchart of the power distribution unit self-test method of one preferred embodiment.

Turning to the embedded software on the PDU and VCUs, PDU 401 has a self-test software program in memory that initiates and runs when DC power is applied. PDU self-test 960, diagrammed in FIG. 12, initiates at system power up event 961 wherein a 12V DC battery is connected to PDU 401 and PDU self-test 960 runs until PDU 401 no longer has DC power applied. The 12V DC battery voltage is checked in step 962. If the 12V DC battery voltage is low, then a signal is sent from PDU 401 to data collection PC 404 in step 963. A warning signal is displayed using PDU LEDs and displayed in data collection PC 404 in step 964. PDU 401 and system 400 is then powered down automatically in step 965. If the battery voltage is acceptable in step 962, then the PDU waits a predetermined time interval in step 966. After the predetermined time interval, the check battery voltage step 962 is repeated. The predetermined time interval is two minutes in the preferred embodiment. The acceptable battery voltage is consistent with a state of charge sufficient to support approximately five minutes of discharge at the current discharge rate: for example, V must be greater than 11.0V for a discharge rate of C/10 corresponding to about 5 minutes of remaining discharge time for a 160 A-h (amp hour) battery.

PDU 401 monitors test start switch 412 in step 967. If test start switch 412 is pressed then a signal is sent from PDU 401 to data collection PC 404 in step 968. PDU 401 monitors USB port 414 for a signal from data collection PC 404 in step 969. A "stop" signal received from data collection PC 404 causes PDU 401 to stop a test run in step 809. The test run is stopped by turning off all high voltage and low voltage power to all downstream VCUs. A "run" signal received from data collection PC 404 simulates test start switch 412 being pressed: PDU 401 operates to run a test according to test method 1000 and run method 909 described in relation to FIGS. 15a, 15b and 16 below.

Figure 13:
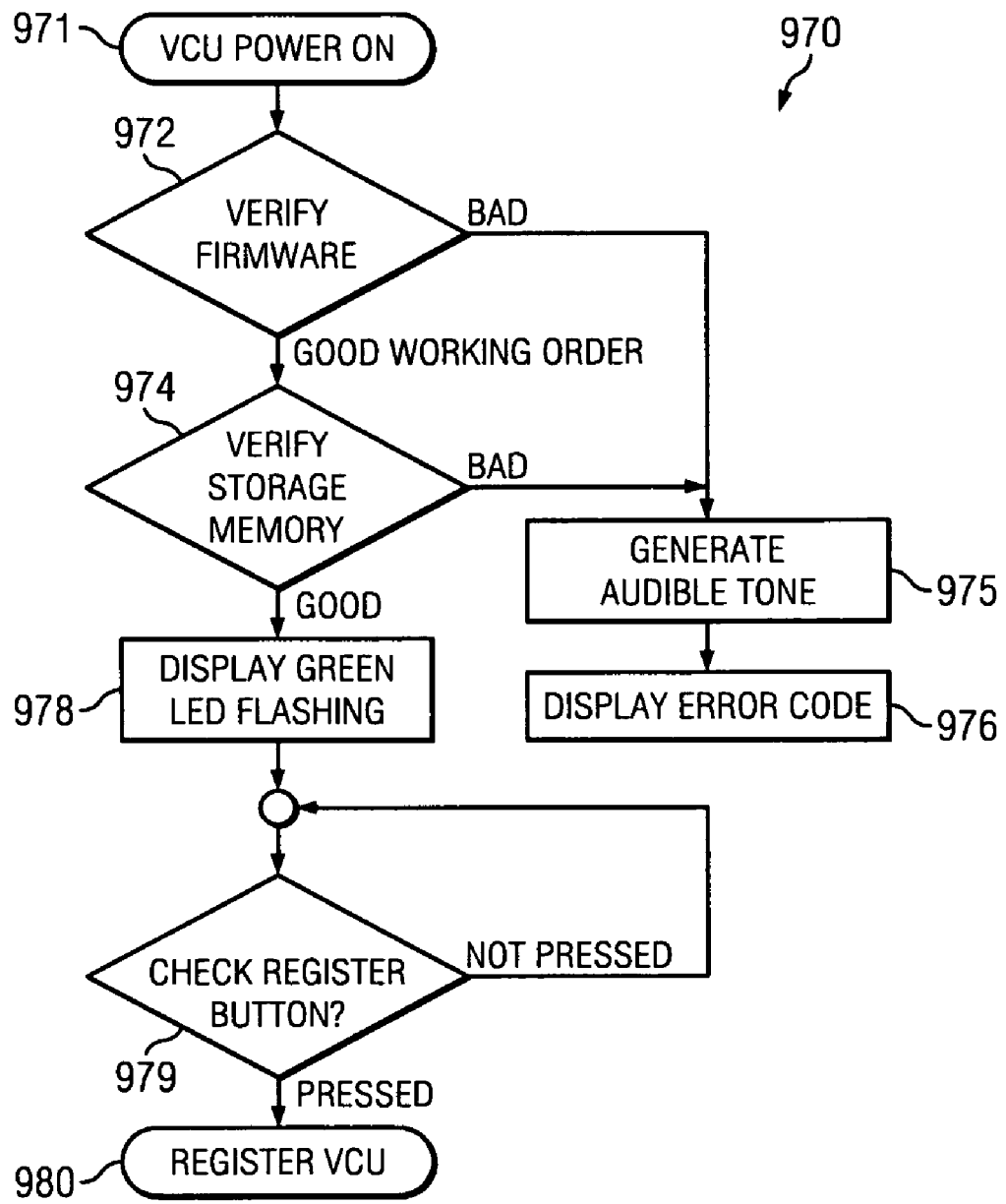
FIG. 13 is a flowchart of the voltage control unit self-test method of a preferred embodiment.

A set of concurrent and continuously running self-tests are implemented as a software program and caused to operate on each VCU of the set of VCUs 402 when LV power is applied to the set of VCUs 402. FIG. 13 shows a flow chart for VCU self-test 970.

At power on event 971, VCU self-test 970 begins by verifying a given VCU's firmware integrity in step 972. If the firmware is verified to be in good working order, then VCU self-test 970 proceeds to verify storage memory integrity of the given VCU in step 974. If both the firmware and the storage memory are good then the VCU self-test 970 continues to step 978 wherein a green flashing LED 978 is displayed, after which a software loop is entered to continuously check the given VCU's register button at step 979. If the register button is pressed then the given VCU is registered in step 980.

If firmware integrity is bad at step 972, then a corresponding audible tone is generated on speaker 408 in step 975. An appropriate error code is displayed using LED 409 in step 976. Also, if storage memory integrity is bad then a corresponding audible tone is generated on speaker 408 in step 975 and an appropriate error code is displayed on LED 409 in display error step 976.

Figure 14:
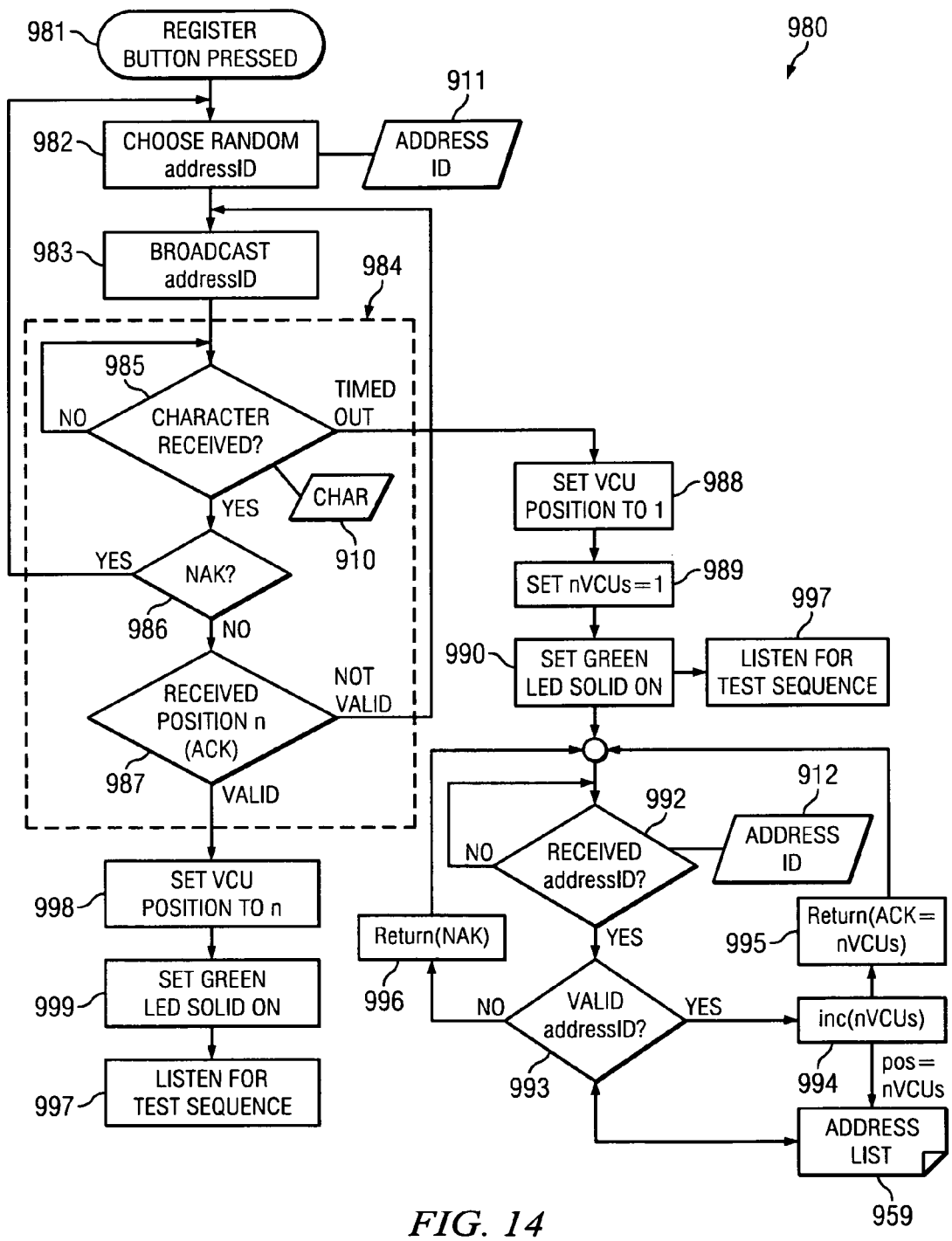
FIG. 14 is a flowchart of the voltage control unit register method in a preferred embodiment.

FIG. 14 is a flowchart of VCU registration step 980 which is implemented on each VCU as a software program initiated by pressing the register button on a given VCU in event 981. A random address ID 911 is generated in step 982 wherein an address is generated from a software controlled random number generator in the given VCU microcontroller. The given VCU then broadcasts the generated address ID 911 to all VCUs in step 983. The given VCU monitors its RS485 communication RX port in step 984 taking actions based on steps 985, 986 and 987. The RS485 communications RX port is checked in step 985 for a received character in response to the broadcasted address ID 911. If a character is received then step 986 is performed with the received character 910. If a character is not received then step 985 is repeated. If after a predefined elapsed time, a character still has not been received, a timeout occurs and step 988 is performed. If the received character 910 is a NAK character as checked in step 986, then the address ID 911 is invalid and step 982 is repeated, generating a new address ID. If the received character 910 is not a NAK character then step 987 checks received character 910 to signify a valid position character n, for example, corresponding to a number in the range [1,255]. If n is not valid, then step 983 is repeated. If n is valid, then step 998 is performed.

In step 998, wherein position character n is valid, the given VCU position number is set equal to n and stored in the given VCU memory. The given VCU is now registered as VCU(n). A green LED is lit continuously in step 999 to visibly indicate a valid registration. In step 997, the given VCU executes software code to wait for a test sequence to be received by the RS485 communications RX port.

In step 988, following the occurrence of a timeout in step 985, the given VCU automatically sets its position number equal to 1 and is now registered as VCU(1). Furthermore, in step 989, VCU(1) initializes the total number of VCUs connected, nVCUs, to a value of 1. A green LED is lit continuously in step 990 to indicate a valid registration. Then VCU(1) executes two software loops: first software loop step 997 listens for a test sequence to be received by the RS485 communications RX port; and second software loop in step 992 listens on RS485 communications RX port for broadcasted address IDs from requesting VCUs as their register buttons are activated. VCU(1) functions as a VCU registrar according to the steps that follow.

When an address ID is received in step 992, the received address ID 912 is checked for validity in step 993. Checking for validity is done by comparing address ID 912 with list of address IDs 959: if a matching address ID exists then address ID 912 is invalid. If a matching address ID does not exist, then address ID 912 is valid and is stored in address list 959 with its position number, the position number being equal to nVCUs after the nVCUs is incremented in step 994. In step 995 the position number is broadcast on VCU(1)'s RS485 communications TX port indicating a position number n=nVCUs to the VCU that requested address ID 912. In step 996, a NAK is broadcast on VCU(1)'s RS485 communications TX port, indicating an invalid address ID to the requesting VCU.

The handling of test sequence configurations by the set of VCUs 402 is explained as follows. In the preferred embodiment, identical test sequence tables are preloaded into each RAM 465 and executed as a set of instructions on each local microcontroller 460. In an alternate embodiment, the test sequence tables are stored in data collection PC 404 and a selected test sequence table downloaded to each VCU as a step in the test setup process.

Test sequence tables are comprised of rows and columns, the kth row defining a test with test number k, and ith column defining a test sequence for VCU(i). The value of the (k, i) entry in the table identifies one of three possible test configurations for VCU(i) while running test k: a value of "+1" identifies a HV current source configuration; a value of "−1" identifies a HV current sink configuration; and a value of "0" (zero) identifies a HV measurement configuration. In the HV current source configuration, HV DC power 431 is connected to the local electrode 451. In the HV current sink configuration, HV RET 432 is connected to the local electrode 451. In the HV measurement configuration, ADC 461 is connected to the local electrode 451. Table 3 shows an example test sequence table.

(k=5) and then configure itself to connect HV ret 421 to its electrode becoming the HV current sink in the sixth test (k=6). The other VCUs configure their test sequences according to the columns of Table 3.

The example given in Table 3 is intended to be a non limiting example. A vast number of test sequence tables may be constructed in the present invention, each sequence table constructed according to the number of VCUs, the geometry of the VCUs, and the test configurations required by a user's analysis methods.

Figure 15A:
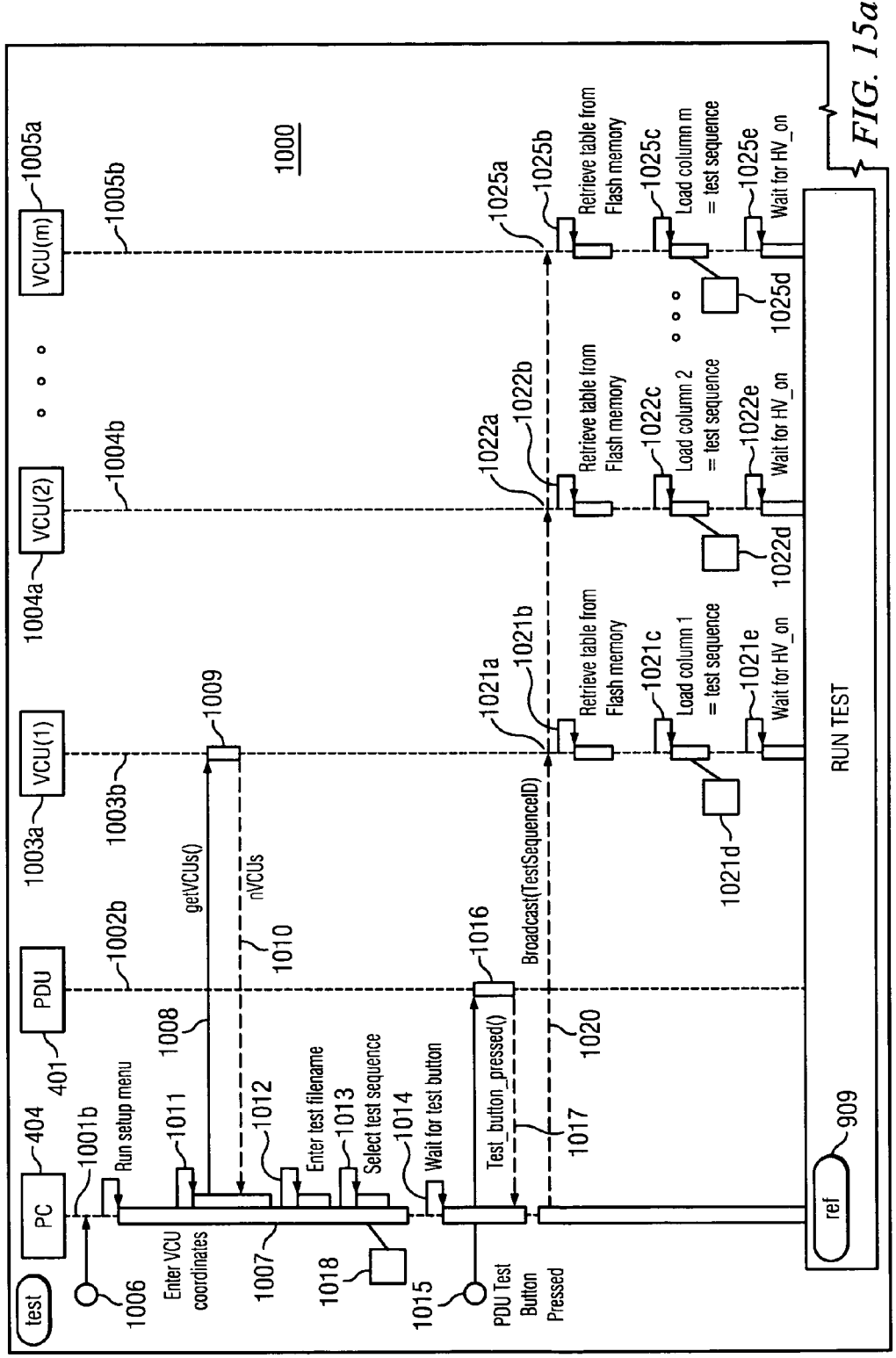
FIG. 15a is a sequence diagram of the first embodiment test method of a f the preferred embodiment.
Figure 15B:
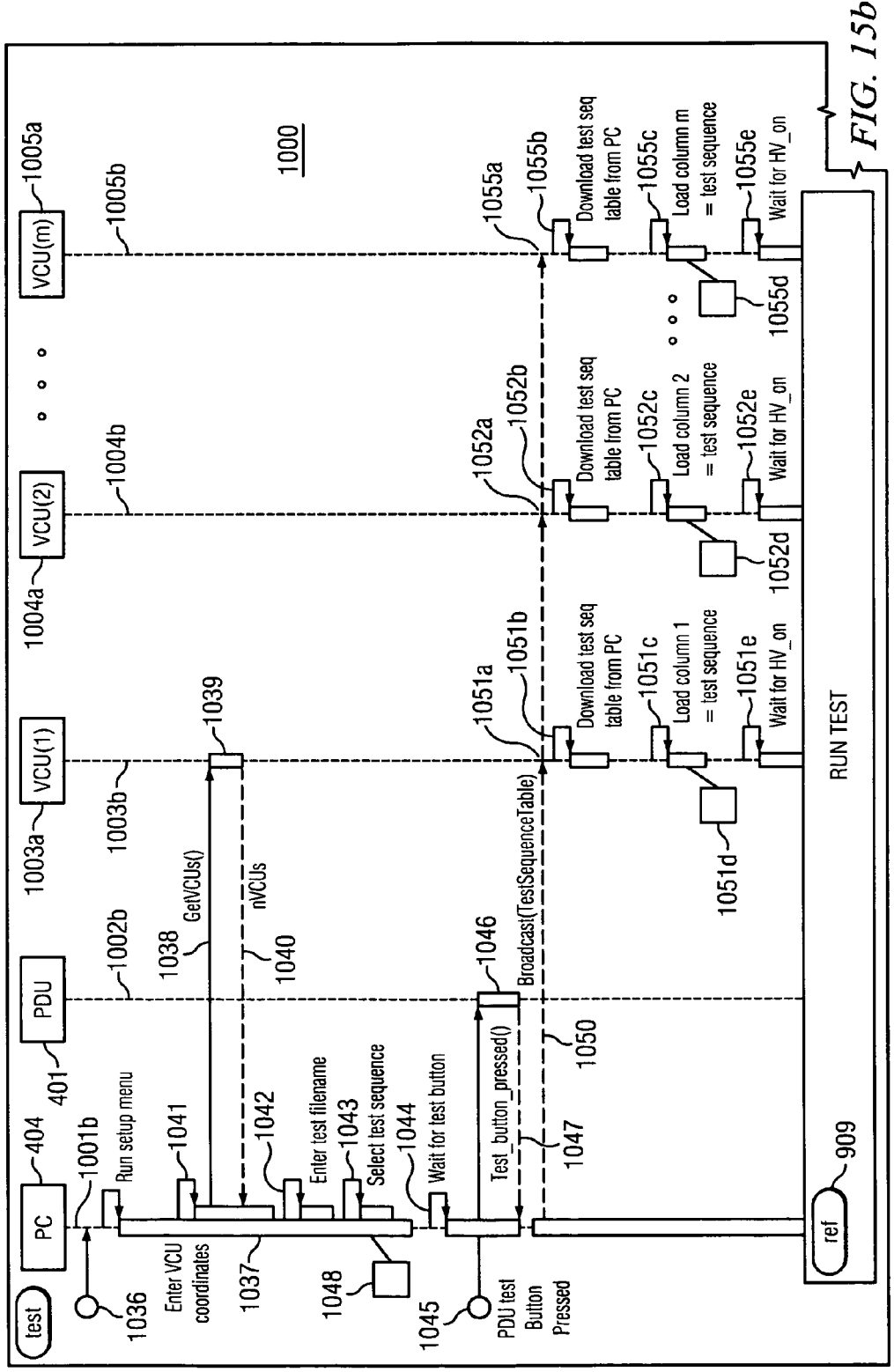
FIG. 15b is a sequence diagram of the second embodiment test method of one preferred embodiment.

Test method 1000 is explained according to the sequence diagrams of FIGS. 15a and 15b. The sequence diagrams show interactions between system entities in sequential order with time. Software programs to support the interactions and their sequential order in test method 1000 are implemented on data collection PC 404, PDU 401, and set of VCUs 402. The system entities of data collection PC 404, PDU 401, and set of VCUs 402 indicated by VCU(1) 1003a, VCU(2) 1004a and VCU(m) 1005a have respective timelines 1001b, 1002b, 1003b, 1004b and 1005b associated with them. Time progresses from top to bottom along the timelines. As time progresses, blocks on a given timeline appear indicating that a software program executes steps to perform a function by the system entity associated to the timeline. Messages are shown as horizontal lines with arrows, a solid line indicating a request and a dashed line indicating data sent.

Prior to test method 1000, set of VCUs 402 have executed VCU self test 970 and register method so that step 997 of listening for a test sequence is functioning. Also, for PDU 401, the PDU self test 960 has been executed so that the battery is being checked, the test button is being checked and the communications from data collection PC 404 is being monitored. The invocation of the methods 960, 970, 980 are not shown in FIGS. 15a and 15b because said methods are independent of the test method 1000. Also, a set of test sequence tables have been pre-stored in the flash memory of all VCUs in set of VCUs 402.

TABLE 3

Example of a TEST SEQUENCE TABLE

|       | VCU(1) | VCU(2) | VCU(3) | VCU(4) | VCU(5) | VCU(6) | VCU(7) | VCU(8) | VCU(9) | VCU(10) |
|-------|--------|--------|--------|--------|--------|--------|--------|--------|--------|---------|
| Test1 | 0      | 0      | 0      | 0      | +1     | −1     | 0      | 0      | 0      | 0       |
| Test2 | 0      | 0      | 0      | +1     | 0      | 0      | −1     | 0      | 0      | 0       |
| Test3 | 0      | 0      | +1     | 0      | 0      | 0      | 0      | −1     | 0      | 0       |
| Test4 | 0      | +1     | 0      | 0      | 0      | 0      | 0      | 0      | −1     | 0       |
| Test5 | +1     | 0      | 0      | 0      | 0      | 0      | 0      | 0      | 0      | −1      |
| Test6 | −1     | 0      | 0      | 0      | 0      | 0      | 0      | 0      | 0      | +1      |

According to Table 3, for example, "Test1" in row 1 has VCU(5) electrode connected to HV DC power 431, VCU(6) electrode connected to HV RET 432 and all other VCUs taking electric potential measurements of their electrodes; "Test2" in row 2 has VCU(4) electrode connected to HV DC power 431, VCU(7) electrode connected to HV RET 432 and all other VCUs taking electric potential measurements on their electrodes; "Test6" in row 6 wherein "Test6" has VCU (10) electrode connected to HV DC power 431, VCU(1) electrode connected to HV RET 432 and all other VCUs taking electric potential measurements on their electrodes.

Further analyzing the test sequences of Table 3: VCU(1) executes a test sequence of [0,0,0,0,+1,−1] configurations; VCU(2) executes a test sequence of [0,0,0,+1,0,0] configurations; and so forth. VCU(1) will configure itself to take an electric potential measurement in the first four tests (k=1, 2, 3 and 4) then configure itself to connect HV power 431 to its electrode becoming the HV current source in the fifth test Beginning from the left of the diagram in FIG. 15a, the data collection PC 404 when stimulated by a run command event 1006 will begin to operate a test setup program 1007 which is a menu driven program by which data collection PC 404 displays a set of options allowing an operator to choose to do any of the following: enter VCU coordinates in step 1011, enter a test filename in step 1012, or select a test sequence in step 1013. Run command event 1006 is typically invoked by clicking on a program icon in the Windows operating system to have the operating system begin execution of the associated test setup program, although the program may be started in any number of ways known in the art. The menu driven program is a Windows program which may be written in Visual Basic or a similar Windows programming environment also known in the art. When a menu item is invoked by selection a corresponding subroutine is executed on the PC.

Upon invoking step 1011 to enter VCU coordinates, message 1008 is sent from data collection PC 404 to VCU(1)

1003a to obtain the number of VCUs in the system. VCU(1) 1003a operates subroutine get VCUs 1009 which returns the number of VCUs, nVCUs 1010. Step 1011 continues by gathering coordinate data for each VCU in the system. In the preferred embodiment, the coordinate data is gathered by entering coordinates into a spreadsheet that is opened when step 1011 is invoked. In an alternate embodiment, step 1011 may cause a coordinate data file to be downloaded from a handheld computer device.

Upon invoking step 1012 to enter a test filename, data collection PC 404 presents a dialog box in which a user may browse the computer file system for a folder and then the user may do one of: selecting an existing filename or typing a new filename. In an alternate embodiment, step 1012 may automatically generate a filename in a default folder in the computer file system of PC 404.

Upon invoking step 1013 to select a test sequence table, data collection PC 404 presents a menu box in which a user may select a test sequence table from a menu of test sequence tables. Each test sequence table has an associated test sequence ID 1018. Test sequence ID 1018 for the selected test sequence table is stored by step 1013 for later use by test method 1000.

Once the steps 1011, 1012 and 1013 have been executed in test setup program 1007, background process 1014 begins to wait for a test button event. A test button event occurs when test start switch 412 is pressed on PDU 401 indicated by event 1015. On event 1015, PDU 401 executes subroutine 1016 that returns signal 1017 indicating that test start switch 412 has been pressed. Upon receiving signal 1017, test setup program 1007 causes data collection PC 404 to broadcast test sequence ID 1018 to the set of VCUs 402 via broadcast message 1020.

At time 1021a VCU(1) receives broadcast message 1020 containing test sequence ID 1018. VCU(1) then executes subroutine 1021b to retrieve the test sequence table associated to test sequence ID 1018 from its flash memory. In subroutine 1021c, VCU(1) loads column 1 from the associated sequence table as test sequence 1021d for execution. After subroutine 1021c, VCU(1) waits for HV DC power 431 to change from 0V to 48V in subroutine 1021e.

Similarly, at time 1022a VCU(2) receives broadcast message 1020 containing test sequence ID 1018. VCU(2) then executes subroutine 1022b to retrieve the sequence table associated to test sequence ID 1018 from flash memory. In subroutine 1022c, VCU(2) loads column 2 from the associated sequence table as test sequence 1022d for execution. After subroutine 1022c, VCU(2) waits for HV DC power 431 to change from 0V to 48V in subroutine 1022e.

Accordingly, at time 1025a VCU(m) receives broadcast message 1020 containing test sequence ID 1018. VCU(m) then executes subroutine 1025b to retrieve the sequence table associated to test sequence ID 1018 from flash memory. In subroutine 1025c, VCU(m) loads the mth column from the associated sequence table as the test sequence 1025d for execution. After subroutine 1025c, VCU(m) waits for HV DC power 431 to change from 0V to 48V in subroutine 1025e.

All other VCUs in the set of VCUs 402 operate programs similar to those given for VCU(m). After a predefined elapsed time from broadcast 1020, run method 909 begins.

FIG. 15b shows an alternative embodiment of the present invention wherein test sequence tables are not pre-stored in flash memory on the set of VCUs. Instead, data collection PC 404 broadcasts a complete test sequence table which is downloaded by each VCU in the set of VCUs. The alternative embodiment of FIG. 15b offers advantages in flexibility, since new test sequences may be constructed in the field to better fit the testing needs. For example, a pre-stored set of tables may not optimally fit the geometry or time requirements for a given test situation.

Beginning from the left of the diagram in FIG. 15b, the data collection PC 404 when stimulated by a run command event 1036 will begin to operate a test setup program 1037 which is a menu driven program by which data collection PC 404 displays as a set of options allowing an operator to choose to do any of the following: enter VCU coordinates in step 1041, enter a test filename in step 1042, or select a test sequence in step 1043. Run command event 1036 and menu driven program are similar to those described in FIG. 15a.

Upon invoking step 1041 to enter VCU coordinates, message 1038 is sent from data collection PC 404 to VCU(1) 1003a to obtain the number of VCUs in the system. VCU(1) 1003a operates subroutine get VCUs 1039 which returns the number of VCUs, nVCUs 1040. Step 1041 continues by gathering coordinate data for each VCU in the system. In the preferred embodiment, the coordinate data is gathered by entering coordinates into a spreadsheet that is opened when step 1041 is invoked. In an alternate embodiment, step 1041 may cause a coordinate data file to be downloaded from a handheld computer device.

Upon invoking step 1042 to enter a test filename, data collection PC 404 presents a dialog box in which a user may browse the computer file system for a folder and then the user may do one of: selecting an existing filename or typing a new filename. In an alternate embodiment, step 1042 may automatically generate a filename in a default folder in the computer file system of data collection PC 404.

Upon invoking step 1043 to select a test sequence table, data collection PC 404 presents a menu box in which a user may select a test sequence table from a menu of test sequence tables. The selected test sequence table 1048 is stored by step 1043 for later use by test method 1000.

Once the steps 1041, 1042 and 1043 have been executed in test setup program 1037, background process 1044 begins to wait for a test button event. A test button event occurs when test start switch 412 is pressed on PDU 401 indicated by event 1045. On event 1045, PDU 401 executes subroutine 1046 that returns signal 1047 indicating that test start switch 412 has been pressed. Upon receiving signal 1047, test setup program 1037 causes data collection PC 404 to broadcast test sequence table 1048 to the set of VCUs 402 via broadcast message 1050.

At time 1051a VCU(1) receives broadcast message 1050 containing the test sequence table 1048. VCU(1) then executes subroutine 1051b to download test sequence table 1048 into VCU(1) random access memory. In subroutine 1051c, VCU(1) loads column 1 from test sequence table 1048 as test sequence 1051d for execution. After subroutine 1051c, VCU(1) waits for HV DC power 431 to change from 0V to 48V in subroutine 1051e.

Similarly, at time 1052a VCU(2) receives broadcast message 1050 containing test sequence table 1048. VCU(2) then executes subroutine 1052b to download test sequence table 1048 into VCU(2) random access memory. In subroutine 1052c, VCU(2) loads column 2 from test sequence table 1048 as test sequence 1052d for execution. After subroutine 1052c, VCU(2) waits for HV DC power 431 to change from 0V to 48V in subroutine 1052e.

Accordingly, at time 1055a VCU(m) receives broadcast message 1050 containing test sequence table 1048. VCU(m) then executes subroutine 1055b to download test sequence table 1048 into VCU(m) random access memory. In subroutine 1055c, VCU(m) loads the mth column from test sequence table 1048 as test sequence 1055d for execution. After subroutine 1055*c*, VCU(m) waits for HV DC power 431 to change from 0V to 48V in subroutine 1055*e*.

All other VCUs in the set of VCUs 402 operate programs similar to those given for VCU(m) in FIG. 15*b* for the alternate embodiment. After a predefined elapsed time from broadcast message 1050, run method 909 begins.

Figure 16A:
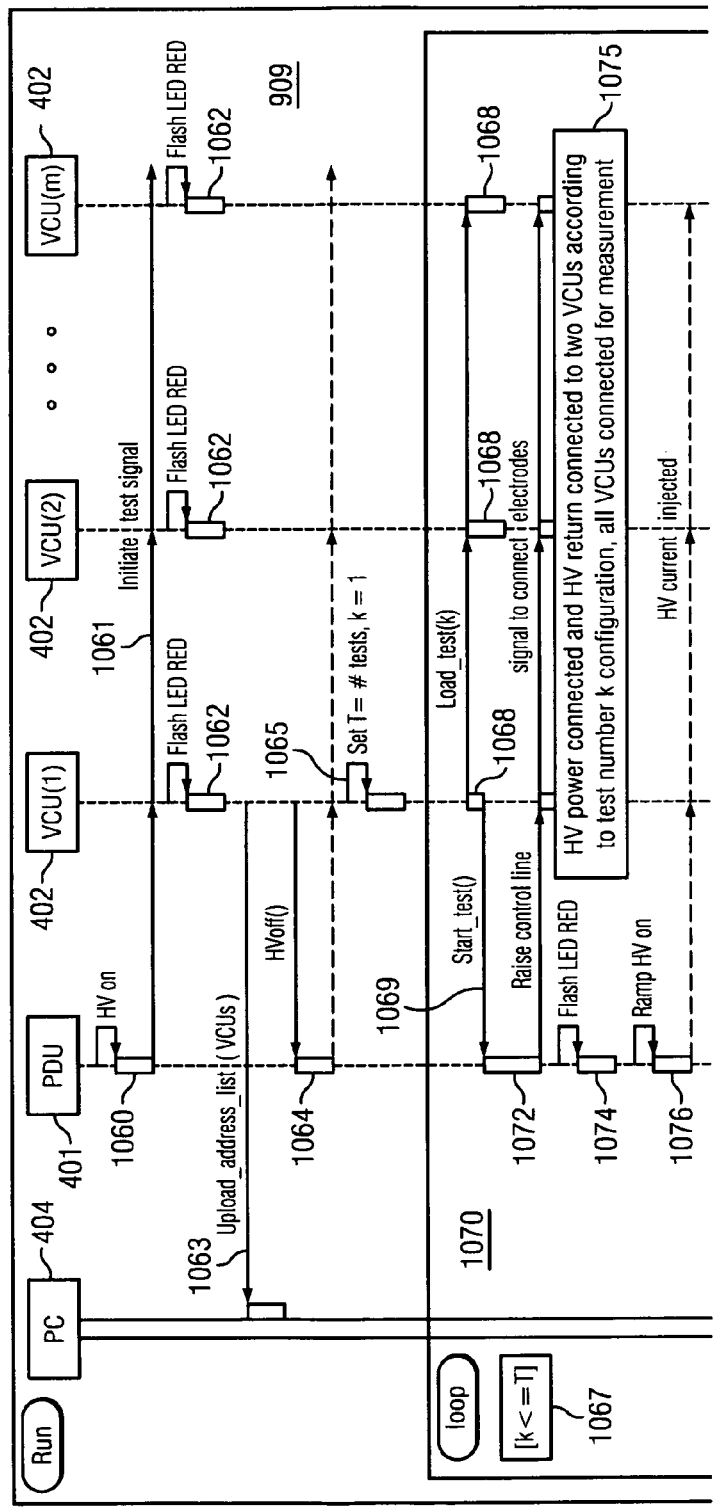
FIG. 16 is a sequence diagram of a run method of one preferred embodiment.
Figure 16B:
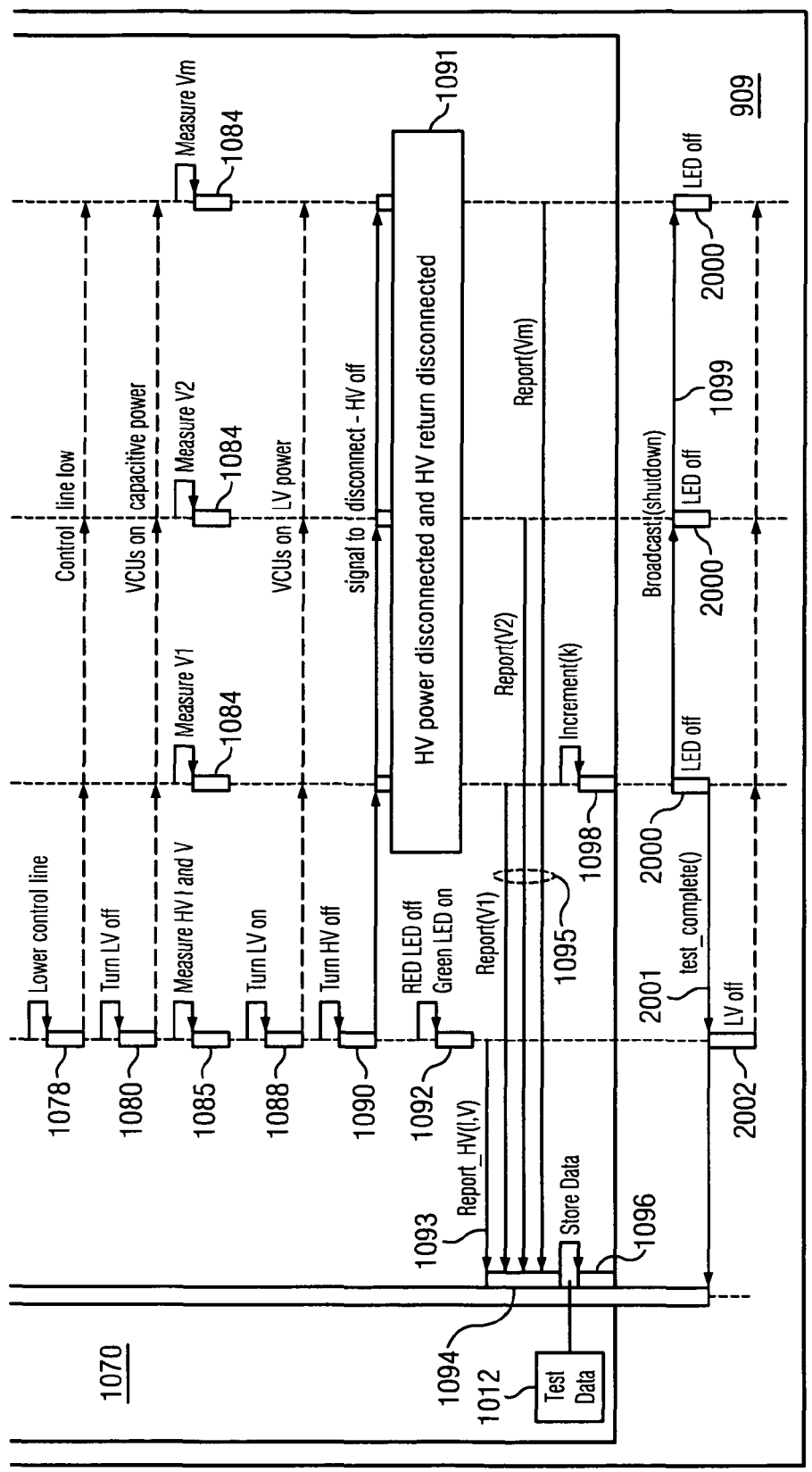

FIG. 16 is a sequence diagram of run method 909. The steps described in run method 909 are implemented as software programs on the system entities of data collection PC 404, PDU 401 and set of VCUs 402. In particular, the program steps taken by VCU(1) in the embodiments of the present invention are preprogrammed into all VCU units, so that any VCU unit that happens to be positioned as VCU(1) (or any other position VCU(n)) may operate accordingly.

In the description of run method 909, it should be understood that stored test sequences such as test sequences 1021*d*, 1022*d*, 1025*d*, 1051*d*, 1052*d* and 1055*d* exist in all of the set of VCUs 402 and are used in run method 909.

Run method 909 starts with the step 1060 in which PDU 401 applies 48V to HV DC power 431 to signal 1061 the initiation of a test run. In other embodiments, a voltage other than 48V (such as a range, for example, of about 0.1 volts to about 50 volts) may be used in step 1060. Upon receiving signal 1061, the VCUs each turn on a red flashing LED in step 1062. The red flashing LED provides an alert that high voltage is being applied to one of the electrodes and a test is underway. VCU(1) in step 1063, sends VCU address list 959 to data collection PC 404 in order of VCU(1), VCU(2), . . . VCU(n). VCU(1) then requests that PDU 401 turn HV DC power 431 to off (zero V) in step 1064 followed by the step 1065 of initializing T, the number of tests in the test sequence, and k, the current test number. In step 1065, T is set equal to the number of configurations in its stored test sequence 1021*d* and *k* is set equal to 1 (one).

Run method 909 continues in loop 1070 (designated by a box structure with the label "loop" in the upper lefthand corner) of FIG. 16. All sequential operations inside of loop 1070 are repeated while condition 1067 is true, condition 1067 being that k is less than or equal to T. In step 1068, the current test number k is sent to the set of VCUs 402 by VCU(1). VCU(1) then instructs each VCU to load the kth test configuration from its stored test sequence. VCU(1) then invokes start_test( ) on PDU 401 in signal 1069 whereupon PDU 401 raises control line 439 in step 1072. PDU 401 sets its LED flashing red in step 1074.

Raising the control line in step 1072 is a signal to the set of VCUs to connect their electrodes. The VCU electrodes are connected at step 1075 according to their loaded configurations from previous step 1068. The two VCUs, one with HV DC power 431 connected, the other with HV RET 432 connected leave their red LEDs flashing while all other VCUs turn off their red LEDs and turn on their green LEDs to flashing. PDU 401 then ramps the HV DC power 431 to its maximum voltage in ramp HV step 1076, the maximum voltage being the voltage limit of HV power supply 426 or the voltage at which the current limit of HV power supply 426 is reached, whichever is reached first. In the preferred embodiment, the high voltage is between about 250 volts and about 2,000 volts. PDU 401 then sets the control line low in step 1078 and disconnects DC-DC converter 424 from LV DC power 434 in step 1080, so that local VCU power reverts to stored capacitive power in each VCU. After an approximately 100 ms time delay, the VCUs in measurement configuration operate their respective ADCs 461 to measure and record the electric potential on their corresponding electrodes 451 in VCU measurement step 1084. During the VCU measurement step 1084, PDU 401 measures HV current, I, and HV voltage, V, of HV DC power 431 and HV RET 432 circuit in step 1085. Referring back to step 1084, an electric potential measurement is also performed in step 1084 by the two VCUs with HV DC power 431 connected and with HV RET 432 connected, the latter measurement being done to correct for any voltage drops between either of the two VCUs and the PDU where the HV current is sourced and sunk.

Run method 909 continues at step 1088 when PDU 401 reconnects LV DC power 434. In step 1090, PDU 401 disconnects HV DC power 431. In step 1091, the two VCUs connected to HV DC power 431 and HV RET 432 disconnect their electrodes after sensing HV power is off. Also, the two VCUs HV put their green LEDs to flashing after turning off their red LEDs. In step 1092, PDU 401 turns off its red LED and turns on a flashing green LED.

In data transfer 1093, PDU 401 sends HV current, I, and HV voltage, V, to data collection PC 404. In step 1094, data collection PC 404 accepts the I, V data sent in step 1093 and accepts a set of data transfers 1095 from the set of VCUs wherein VCU(1), VCU(2), VCU(m) report their electric potential measurements obtained in previous step 1084. In the preferred embodiment, step 1095 is accomplished using a protocol with predefined sequential time slots for data transfer over the RS-485 communications link wherein VCU(1) reports data in time slot 1, VCU(2) reports data in time slot 2, . . . , VCU(m) reports data in time slot m up to m=nVCUs. Data collection PC 404 then collects and stores the reported data into stored test data 1012 in step 1096.

In step 1098, run method 909 increments test number k; loop 1070 is repeated if k less than or equal to T according to condition 1067. If k is greater than T, then all tests in the test sequence are complete and run method 909 causes VCU(1) to broadcast a shutdown command 1099 to all VCUs and PDU 401. The set of VCUs respond to shutdown command 1099 by turning off their LEDs in step 2000. VCU(1) then sends test_complete( ) command 2001 to data collection PC 404 and to PDU 401. PDU 401 then responds to test_complete( ) command 2001 by turning off LV DC power 434 to set of VCUs 402 at step 2002. Step 2002 completes the run method 909.

Figure 17:
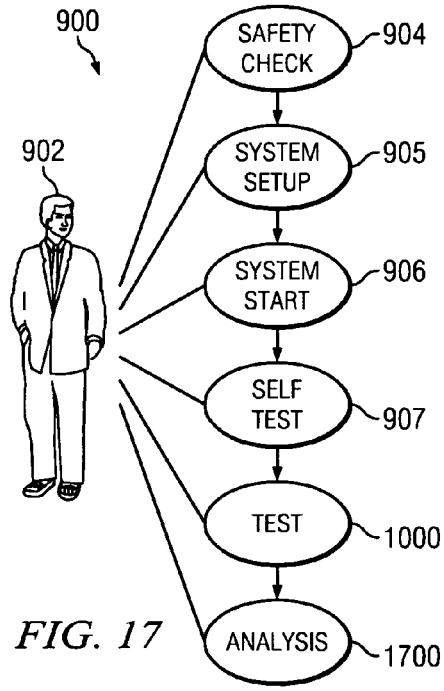
FIG. 17 is block diagram of the preferred mode of operation of the of the preferred embodiment.

A diagram of the preferred method of operation 900 for a preferred embodiment of system 400 is shown in FIG. 17. Method of operation 900 requires participation of a field operator 902 interacting with and performing a number of operations, in order: safety operation 904, system setup operation 905, system start operation 906, self test operation 907, test method 1000 and analysis 1700.

Figure 19:
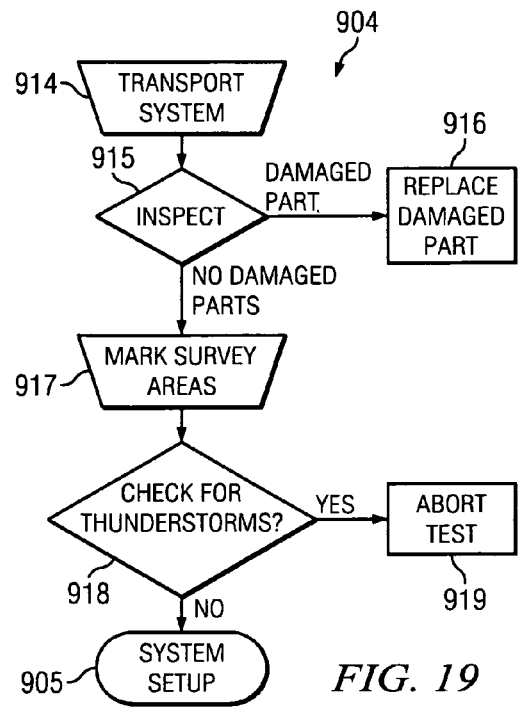
FIG. 19 is a flowchart of a preferred safety check and pre-setup operation.

FIG. 19 shows a flow chart of safety operation 904. In safety operation 904, field operator 902 is responsible for transport and setup of system 400. Safety operation 904 begins with step 914 of transporting system 400, eight-conductor flexible cables 405, set of VCUs 402, 12V DC battery 406, data collection PC 404, and electrodes 451 to a field site for setup. A safety inspection is then performed in step 915 in which system 400 is inspected for damages, the inspection including all power cords and eight-conductor flexible cables 405 to ensure that the insulation on said cords and cables is not damaged. If any damage conditions exist, the damaged part is replaced in step 916. While seemingly a detail, this step provides a critical benefit of the preferred embodiment. In this step, any defective PDU may be replaced by another PDU and any defective VCU may be replaced by another VCU because the system components are interchangeable. This advantage allows transportation of less overall equipment than prior art systems with duplicated components and cabling.

If no damaged parts exist or damaged parts are replaced in step 916, safety operation 904 continues with step 917. In step 917, the test site survey area is marked with warning signs. Safety operation 904 includes step 918 of checking for thunderstorms in the vicinity of the test site. If a thunderstorm or rainy condition is impending then the test operation 900 is aborted in step 919 and if no thunderstorms or rainy conditions exist, test operation 900 proceeds with system setup operation 905.

Figure 23:
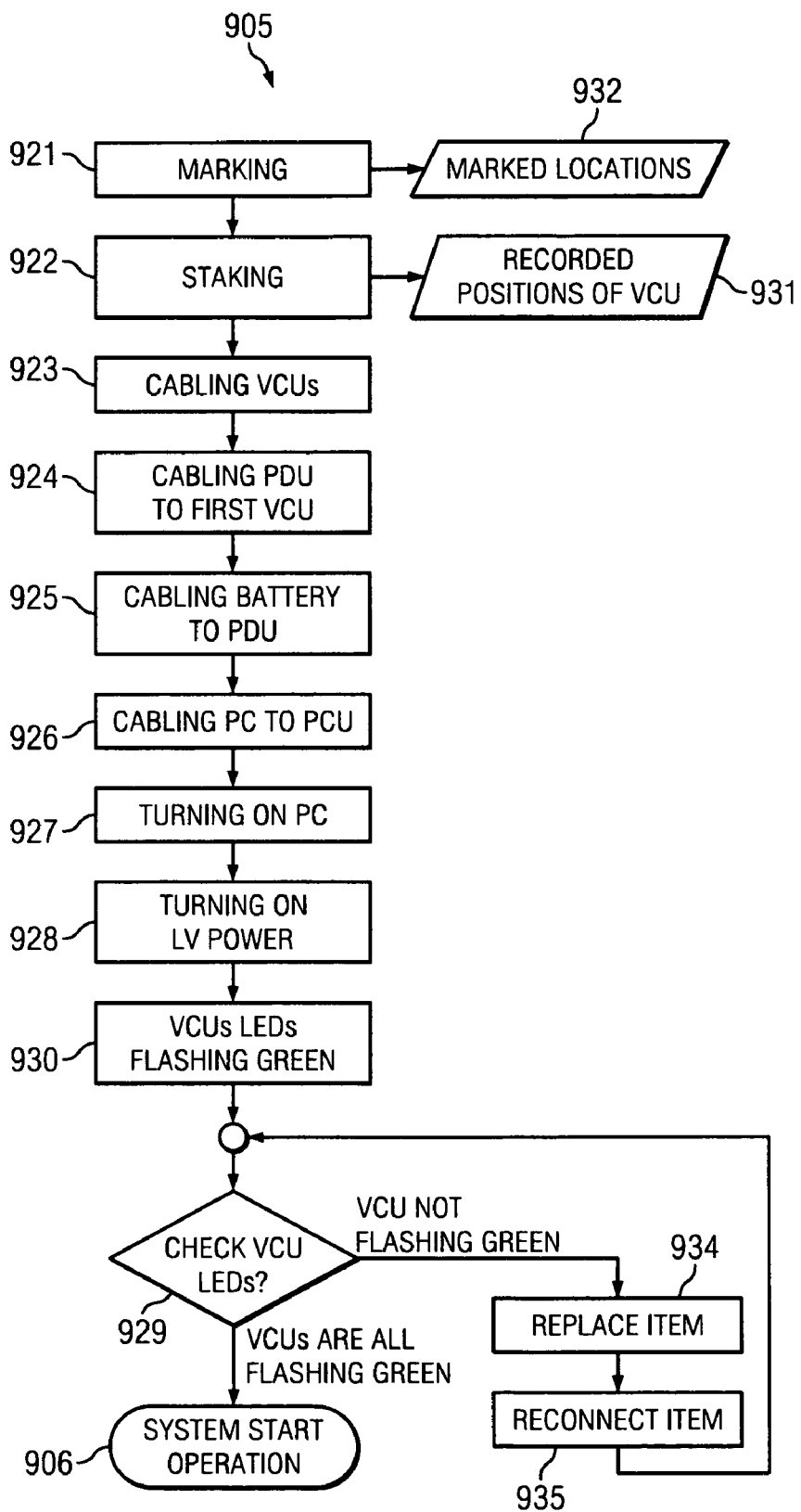
FIG. 23 is a flowchart of a preferred system setup operation.

System setup operation 905, is described in further detail with reference to FIG. 23. At step 921, a tape measure is placed along the survey line, and marks are placed at predetermined spacings along the survey line forming marked locations 932. Then electrodes 101, which are typically metal stakes, are driven into the ground at marked locations 932 in step 922. While staking in step 922, field operator 902 manually records the positional coordinates of each electrode stake location in step 931. The recorded positions 931 are kept for use later in the test process.

Recorded positions 931 of each electrode stake may be written on paper or alternatively stored into a personal digital assistant, PDA, or other suitable handheld computing device. In another embodiment of step 922, a GPS enabled handheld computing device may be held in collocation with the marked locations 932 to store recorded positions 931 wherein GPS coordinates of the electrode stake are entered automatically into the handheld computing device.

In step 923, the VCUs in the set of VCUs 402 are laid out in order from upstream to downstream near the marked locations 932. Eight-conductor flexible cables 405 are connected from each VCU downstream connector 442 to each VCU upstream connector 441. After step 923 is complete, second cabling step 924 is performed wherein the eight-conductor flexible cables 405 are attached between PDU 401 output connector 440 and VCU(1) upstream connector 441. After step 924 is complete, step 925 connects 12V DC battery 406 to PDU 401 via DC power connector 407 and then in step 926, data collection PC 404 is connected to PDU 401 wherein data collection PC 404 power is connected to computer power port 416 and data collection PC 404 USB port is connected to USB port 414 for data communications. In step 927, data collection PC 404 is turned "on". Optionally, in step 926, data collection PC 404 is connected to RS-232 port 413 for data connection to PDU 401.

The main on/off switch 410 is turned "on" in step 928 which results in low voltage power being applied to the set of VCUs 402. A flashing green LED on a given VCU at step 930 indicates that the given VCU is correctly cabled and powered, having run self-test 970. System setup operation 905 concludes with a system integrity check in step 929. In step 929, field operator 902 checks VCU LEDs to be flashing green. If there is a misconnected or damaged item the affected LED will not be lit and flashing. The misconnection or damaged item is replaced in step 934 and the new item is reconnected in step 935. Step 929 is repeated until the set of VCUs 402 are all checked and working properly. System 400 is now in a state in which the set of VCUs are cabled together and are positioned next to their respective stakes, the set of VCUs having power and communications connections to the PDU, the PDU operatively connected to a DC battery and to a PC, and the VCUs having LV power applied to them. The system is then started by proceeding with system start operation in step 906.

Figure 24:
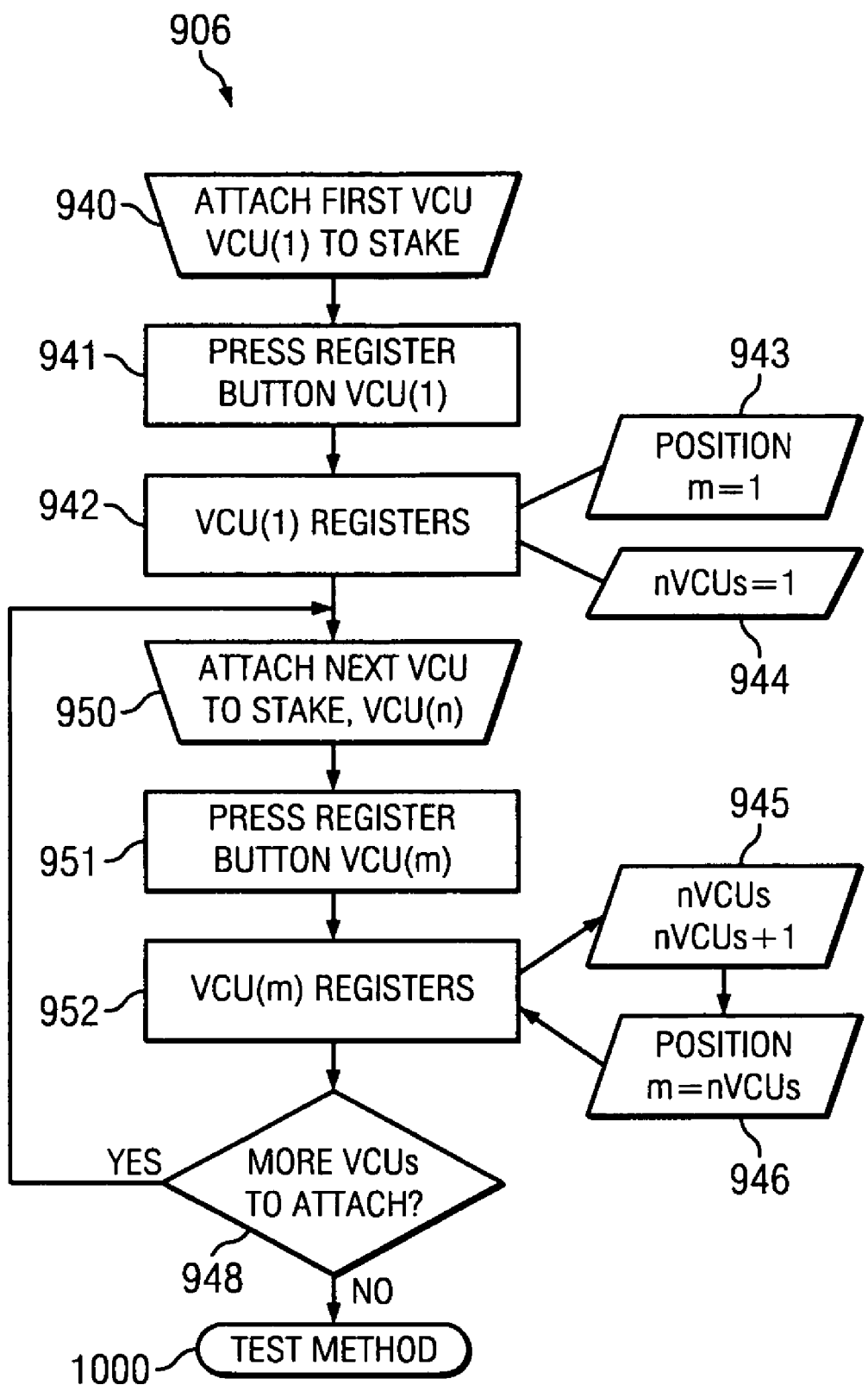
FIG. 24 is a flowchart of a preferred system start operation.

Step 906 is further described in reference to FIG. 24. FIG. 24 begins at step 940 where VCU(1) is attached to its electrode 451. It is significant to test operation 900 that field operator 902 begin system start operation 906 with VCU(1) and work downstream away from PDU 401 to attach subsequent VCUs to their respective electrodes in downstream order. Register button 453 on VCU(1) is pressed in step 941 causing VCU(1) to run VCU register method 980. As a result of register method 980, VCU(1) recognizes that it is the first VCU in the set of VCUs to be connected in step 942 having assigned position 943 to m=1. The number of VCUs in the string is also set to 1 at step 944.

System start operation 906 continues as all of the set of VCUs 402 to their electrodes 451 in downstream order. The next downstream VCU, VCU(2) is attached to its electrode in step 950 after which VCU(2)'s register button 453 is pressed in step 951. Step 951 causes VCU(2) to run VCU register method 980. In step 952, the result of register method 980 being that VCU(1) increments the number of VCUs in the system, nVCUs, (945) stores an address ID for VCU(2) and gives VCU(2) its position number m=2 (946). At step 948, the system waits a predetermined period of time to determine if other VCUs exist and require registration. If so, the system loops to step 950. Steps 950, 951 and 952 are repeated for VCU(3), VCU(4), VCU(m) including all of the set of VCUs 402.

After the set of VCUs 402 are connected and registered, test is initiated by executing test method 1000. Test method 1000 is used repeatedly to complete a set of test runs which results in a set of test data 1012. The test data is analyzed according to analysis method 1700.

Figure 18:
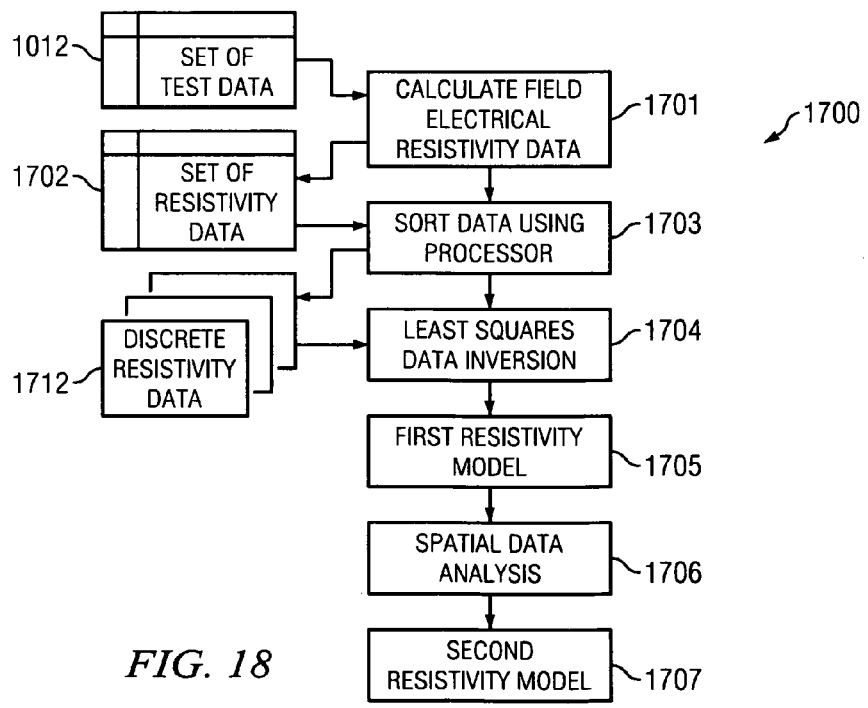
FIG. 18 is the analysis method of the preferred embodiment.

To analyze the set of test data 1012 gathered by system 400, the steps at FIG. 18 are followed. Referring to FIG. 18, a flow chart is shown depicting the steps involved in producing the subgrade resistivity map. In step 1701, data collection PC 404 calculates electrical resistivity from the measured voltages and currents in test data 1012 and stores them into a file resistivity data 1702 according to the following equation:

$$\rho_{nm} = K \frac{V_{nm}}{I}$$

Where,

K is an electrode geometric constant,

Vnm is the electric potential difference between two electrodes, electrode at position n and electrode at position m, I is the injected current which corresponds to the measured HV current, and ☐nm is the current density between the electrodes at positions n and m.

The data collection PC 404 also calculates, based on the known locations of the current electrodes 102 and voltage electrodes 103, virtual resistivity locations corresponding to the calculated resistivity values. In step 1703, the data collection PC 404, using SWIFTCNV software from SAGA Geophysics, or an equivalent, sorts the virtual resistivity locations and resistivity data from resistivity data 1702 into a number of discrete sets 1712, each consisting of a spatial set of coordinates and a resistivity values at those coordinates.

Figure 20:
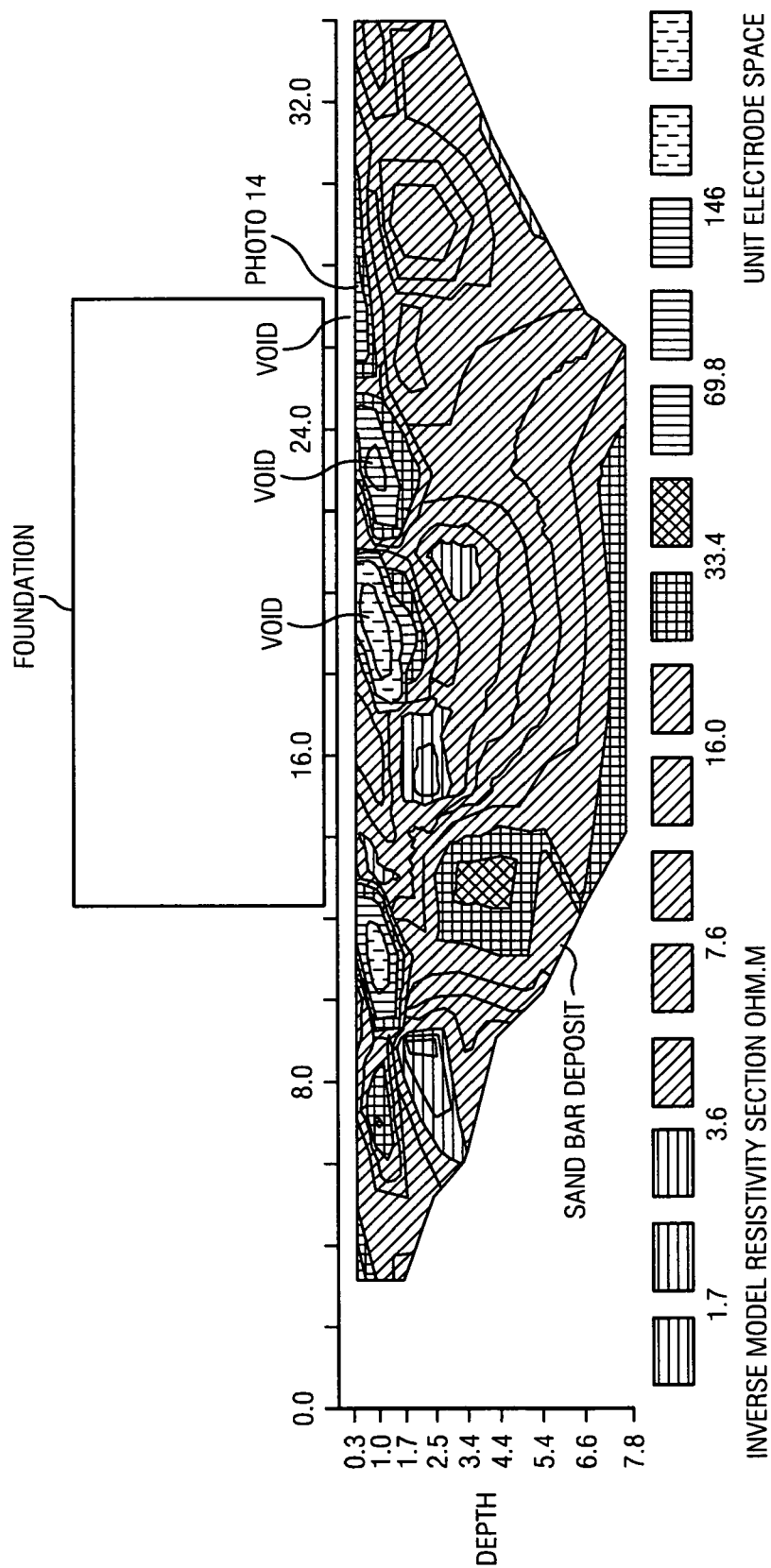
FIG. 20 is an example of a first resistivity model.

Next, in step 1704, the data collection PC 404 performs a least squares data inversion analysis on the discrete sets 1712 to create a first electrical resistivity model 1705. To perform this least squares data inversion, software such as RES2DINV by SAGA Geophysics may be used; however, a number of programs are available that can perform the least squares inversion and produce a two- or three-dimensional graphical output. First electrical resistivity model 1705 minimizes the error of the field data. FIG. 20 is an example of a two-dimensional graphical output of the least squares data inversion analysis of step 1705. FIG. 20 shows ill-defined voids and subsurface features such as a sandbar.

Figure 21:
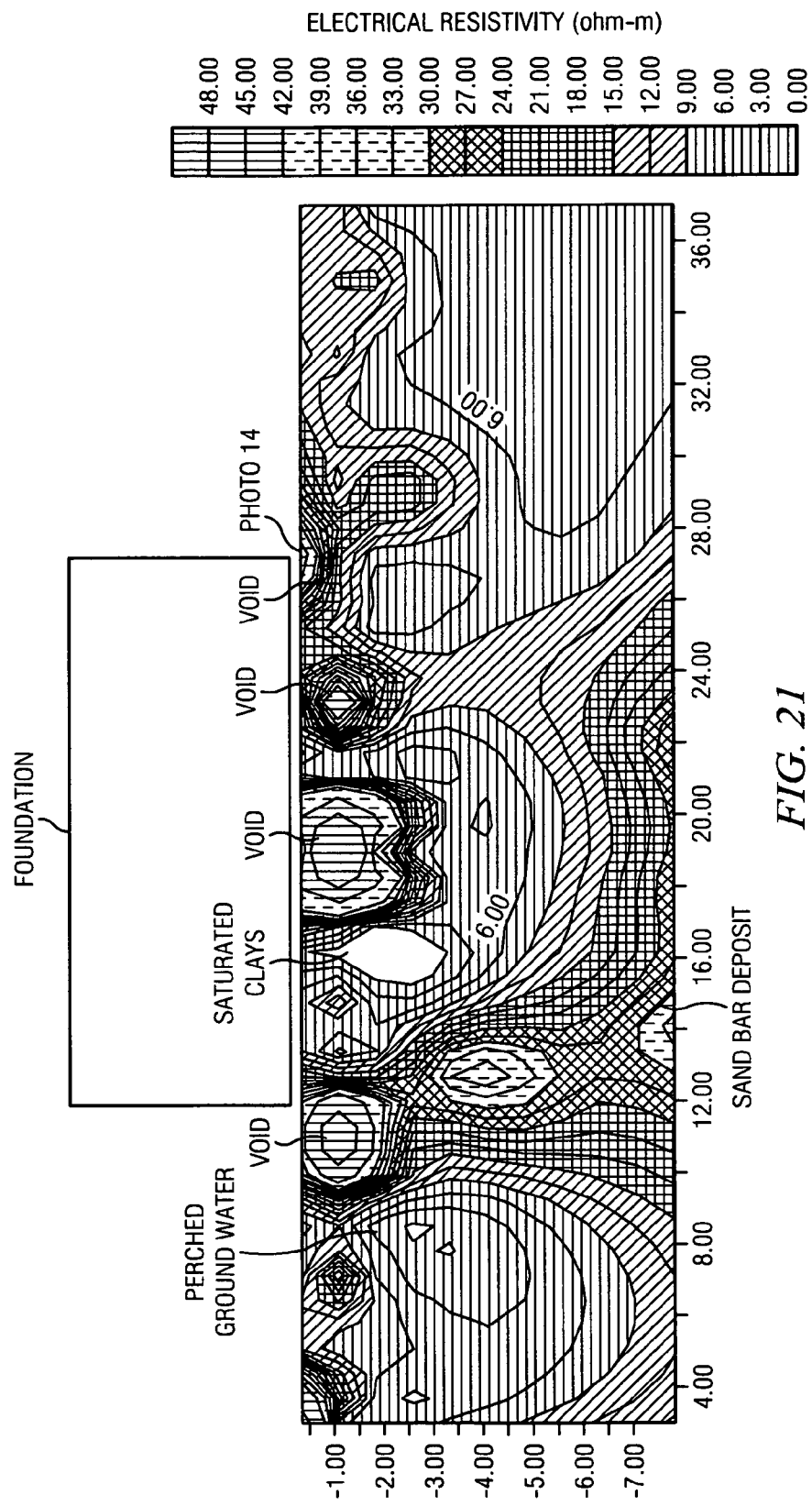
FIG. 21 is an example of a second resistivity model.

At step 1706, a spatial data analysis is performed using geostatistical methods known in the art, such as kriging. Step 1706 produces a second electrical resistivity model (step 1707) that minimizes the error of the spatial variability of the first electrical resistivity model. SURFER is a typical commercially-available geostatistical analysis program; however, any geostatistical analysis program may be used. Again, the output is typically a two- or three-dimensional graphical representation of location and resistivity. FIG. 21 is an example of a two-dimensional graphical output of the kriging analysis. FIG. 21 shows with much greater clarity voids, saturated soil, ground water and sandbar deposits.

In another embodiment of the preferred embodiment, an alternative computer other than the data collection PC 404 is used to analyze the data, the alternative computer typically being off-site and having much greater computing capacity than the data collector. Test data files may be transferred by to the alternative computer by portable storage means such as a diskette or a compact disc or the test data files may be transferred over a computer network such as the internet.

The embodiments of the system apparatus described thus far have relied upon measuring the voltage of the electrode pin, electrode 451 of FIG. 6, of each VCU referenced to the ground electrode which is tied to reference port 417 of FIG. 5. The voltage measured by an analog-to-digital converter (ADC) in this way may be a quite large voltage approaching the full HV DC voltage. An improved embodiment of the present invention allows for the simultaneous measurement of differential voltages between VCUs while high voltage current is being injected into the ground. The measured voltage per ADC is effectively reduced, thereby proportionally reducing absolute ADC quantization noise and any multiplicative inter-electrode noise. Expected measurement times and number of averaging cycles are reduced due to the lower noise levels.

Figure 25:
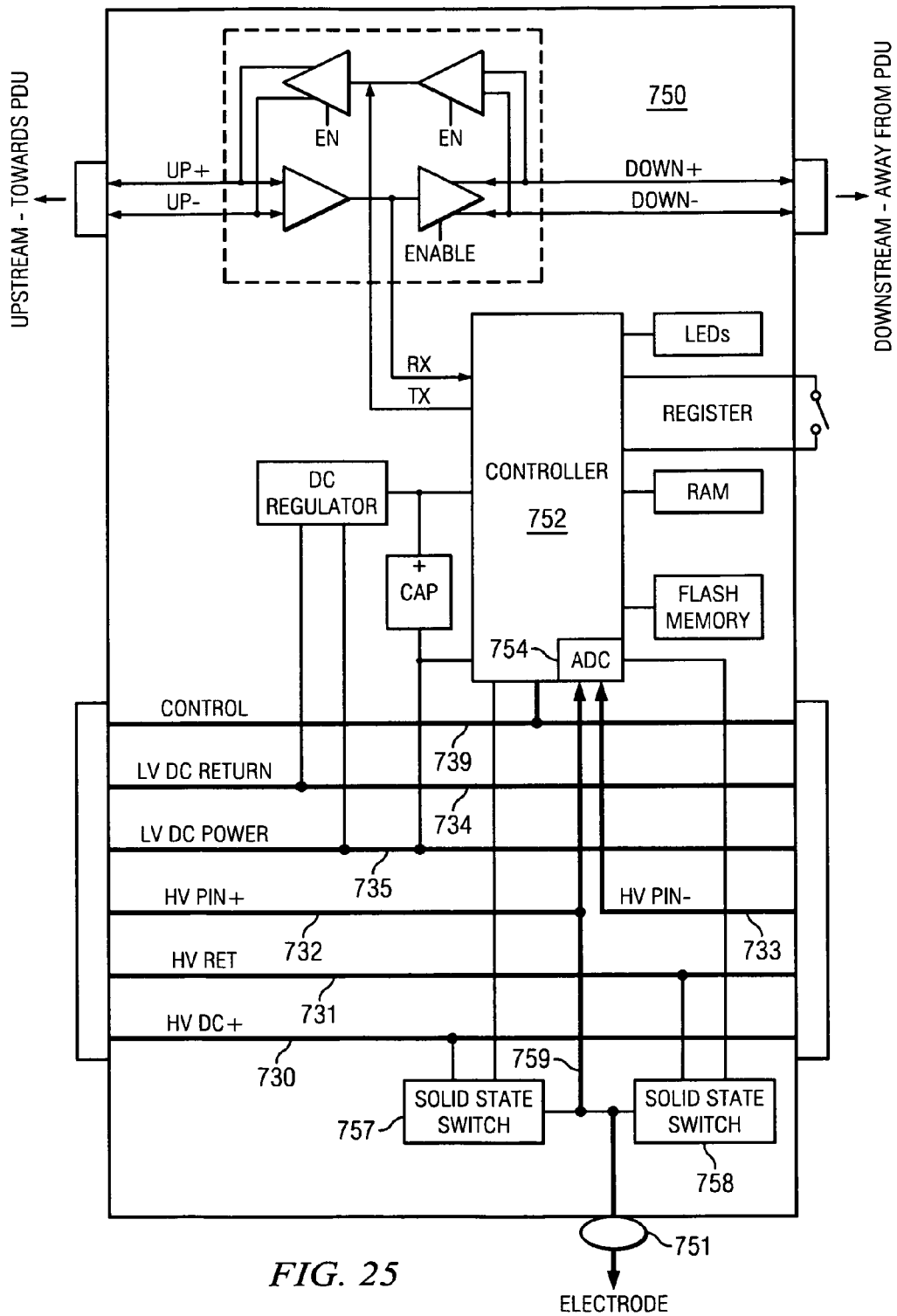
FIG. 25 is a schematic diagram of a voltage control unit configured for differential voltage measurement between adjacent pairs of stakes.

FIG. 25 is a drawing of a voltage control unit, VCU 750, capable of measuring the voltage difference between its own electrode 751 and the electrode of the adjacent connected downstream VCU. The internal components and external connectors of VCU 750 are similar to the internal components and external connectors of VCU 450 as described previously in relation to FIG. 6 except for those items explicitly numbered in FIG. 25. VCU 750 includes at least a controller 752, two solid state switches 757 and 758, a switch 759, and electrode 751 staked into earth and an analog-to-digital converter ADC 754. Controller 752 is programmed to at least measure voltage data using ADC 754, control solid state switches 757 and 758, and control switch 759. Controller 752 is further programmed to communicate voltage measurements to upstream components and interpret instructions received from upstream components. VCU 750 has control line 739, low voltage LV DC power line 735, low voltage DC return line 734, HV DC power line 730 and HV DC return line 731, all of which are ultimately connected upstream to the PDU via an eight-conductor flexible cable (not shown).

Solid state switch 757 is programmed by controller 752 to one of (a) connect HV DC+ line 730 to electrode 751, or (b) isolate HV DC+ line 730 from electrode 751. If solid state switch 757 connects HV DC+ line to electrode 751, then VCU 750 is injecting high voltage current into the earth as a part of a test procedure.

Solid state switch 758 is programmed by controller 752 to one of (a) connect HV DC− line 730 to electrode 751, or (b) isolate HV DC− line 730 from electrode 751. If solid state switch 757 connects HV DC− line to electrode 751, then VCU 750 is returning high voltage current from the earth as a part of a test procedure.

VCU 750 includes HV pin (−) line 733 which is connected to a downstream VCU electrode and further connected to ADC 754 for voltage measurement. HV pin (+) and HV pin (−) lines are connected to upstream and downstream VCUs, respectively, via the eight-conductor flexible cable. ADC 754 is capable of measuring the differential voltage between HV pin (+) 732 and HV pin (−) 733.

Figure 26:
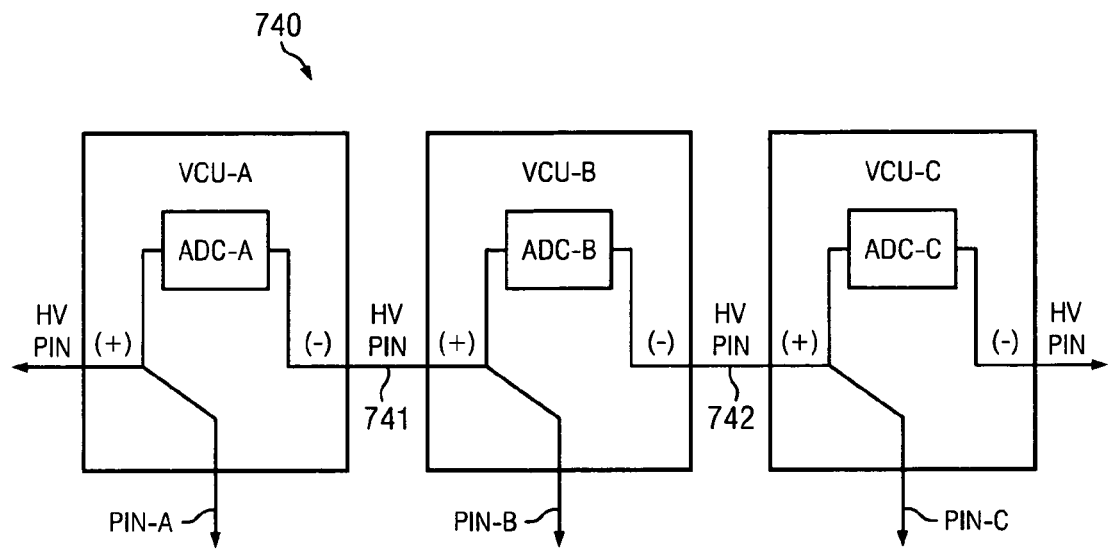
FIG. 26 is a schematic diagram of an example set of voltage control units configured to make a differential voltage measurement.

FIG. 26 indicates how a set of VCUs 740 are interconnected to effect differential voltage measurements between their electrodes. VCU-A has ADC-A for voltage measurement and electrode PIN-A inserted into the earth at its physical location. Similarly, VCU-B has ADC-B for voltage measurement and electrode PIN-B inserted into the earth at VCU-B's physical location and VCU-C has ADC-C for voltage measurement and electrode PIN-C inserted into the earth at VCU-C's physical location. VCU-A, VCU-B and VCU-C are similar to VCU 750 of FIG. 25. The VCUs are interconnected such that HV pin (−) of VCU-A is connected to HV pin (+) of VCU-B via HV pin line 741 and HV pin (−) of VCU-B is connected to HV pin (+) of VCU-C via HV pin line 742.

VCU-A effects a measurement of the voltage difference VAB between PIN-A and PIN-B. VCU-B effects a measurement of the voltage difference VBC between PIN-B and PIN-C. The voltage difference VAC between VCU-A and VCU-C may be obtained by adding: VAC=VAB+VBC. The set of VCUs 740 may be generalized to include a number N of VCUs connected together in series to form a system for which a number of combinations, larger than N, of differential voltages may be measured between the electrodes of the VCUs.

Figure 27:
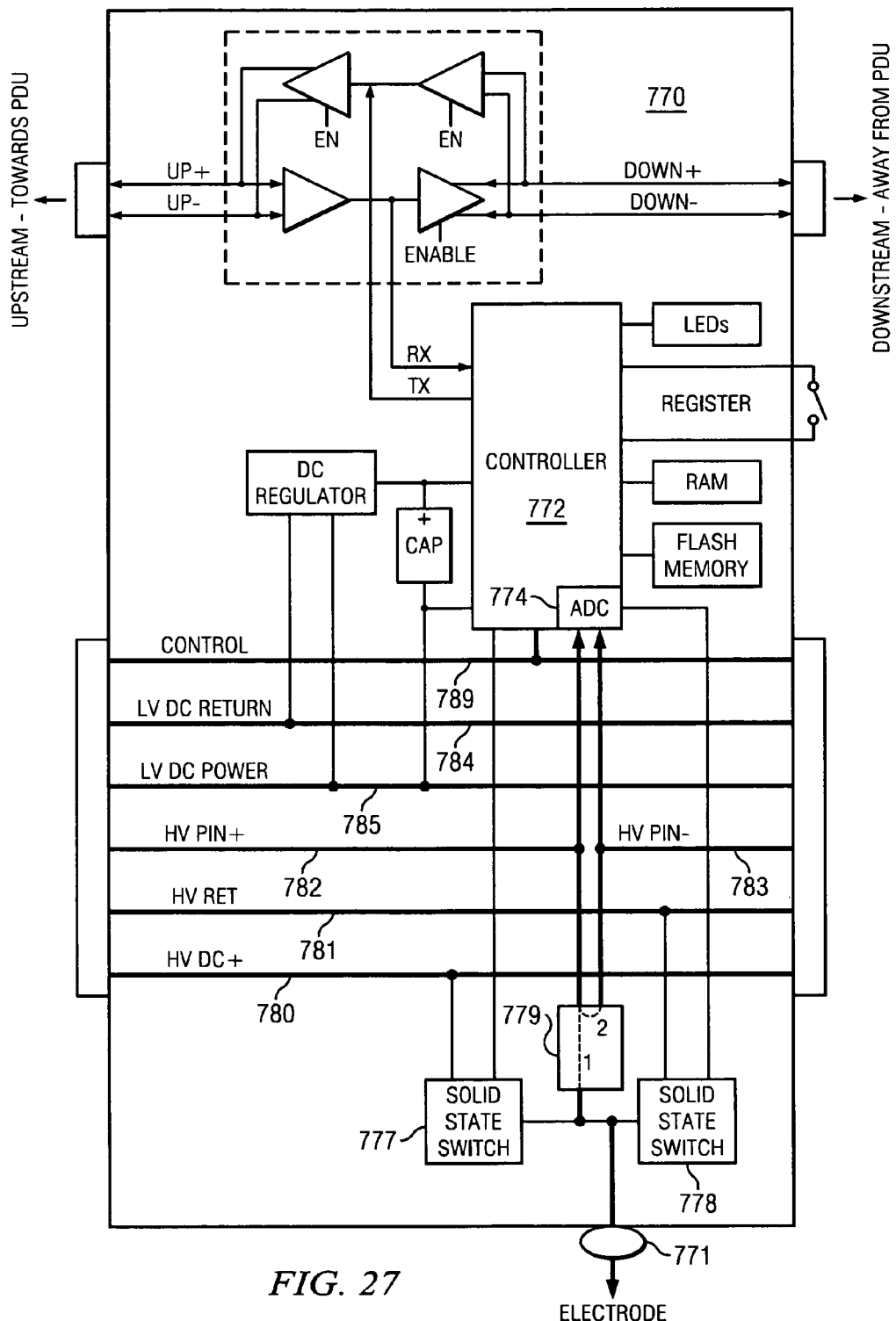
FIG. 27 is a schematic diagram of a voltage control unit programmably configured for differential voltage measurement between any pair of stakes.

Further improvements over the embodiments of FIGS. 25 and 26 may be conceived. For example, FIG. 27 is a drawing of a voltage control unit, VCU 770, capable of measuring the voltage difference between its own electrode 771 and the electrode of any downstream VCU. The internal components and external connectors of VCU 770 are similar to the internal components and external connectors of VCU 450 as described previously in relation to FIG. 6 except for those items explicitly numbered in FIG. 27. VCU 770 includes at least a controller 772, two solid state switches 777 and 778, a switch 779, and electrode 771 staked into earth and an analog-to-digital converter ADC 774. Controller 772 is programmed to at least measure voltage data using ADC 774, control solid state switches 777 and 778, and control switch 779. Controller 772 is further programmed to communicate voltage measurements to upstream components and interpret instructions received from upstream components. VCU 770 has control line 789, low voltage LV DC power line 785, low voltage DC return line 784, HV DC power line 780 and HV DC return line 781, all of which are ultimately connected upstream to the PDU via an eight-conductor flexible cable (not shown).

Solid state switch 777 is programmed by controller 772 to one of (a) connect HV DC+ line 780 to electrode 771, or (b) isolate HV DC+ line 780 from electrode 771. If solid state switch 777 connects HV DC+ line to electrode 771, then VCU 770 is injecting high voltage current into the earth as a part of a test procedure.

Solid state switch 778 is programmed by controller 772 to one of (a) connect HV DC− line 780 to electrode 771, or (b) isolate HV DC− line 780 from electrode 771. If solid state switch 777 connects HV DC− line to electrode 771, then VCU 770 is returning high voltage current from the earth as a part of a test procedure.

VCU 770 has a HV pin (+) line 782 which is connected to switch 779 and further connected to ADC 774 for voltage measurement. VCU 770 also has a HV pin (−) line 783 which is connected to switch 779 and further connected to ADC 774 for voltage measurement. HV pin (+) and HV pin (−) lines are connected to upstream and downstream VCUs, respectively, via the eight-conductor flexible cable. ADC 774 is capable of measuring the differential voltage between HV pin (+) line 782 and HV pin (−) line 783.

Switch 779 is programmed by controller 772 to connect one of (a) HV pin (+) line 782 to electrode 771, or (b) HV pin (+) line 782 to HV pin (−) line 783.

Figure 28:
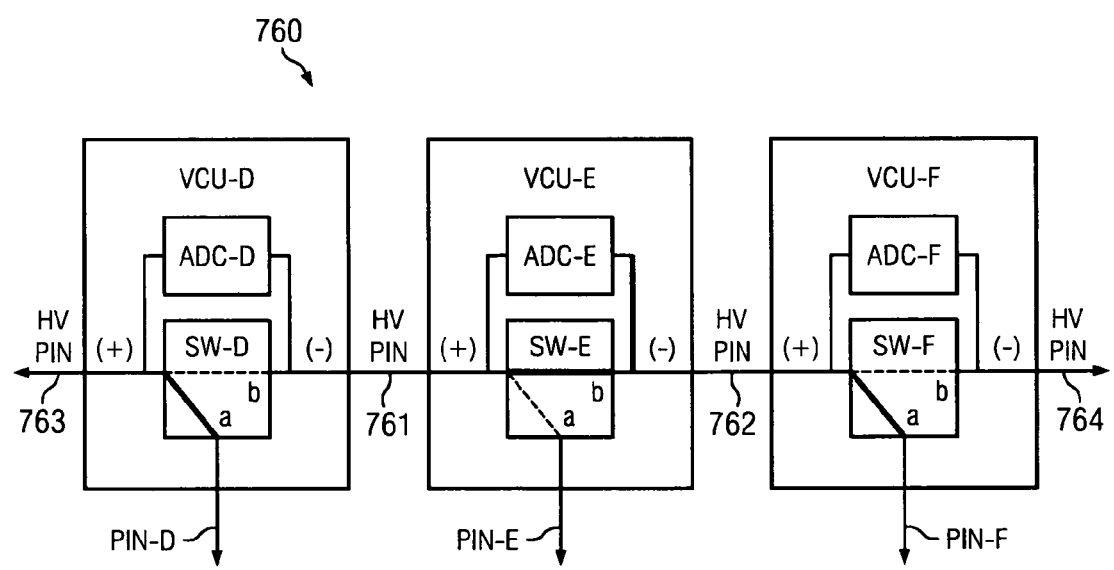
FIG. 28 is a schematic diagram of an example set of voltage control units configured to make a programmable differential voltage measurement between a pair of non adjacent stakes.

FIG. 28 indicates how a set of VCUs 760 are interconnected to effect differential voltage measurements between their electrodes. VCU-D has ADC-D for voltage measurement, switch SW-D for configuration and electrode PIN-D inserted into the earth at its physical location. Similarly, VCU-E has ADC-E for voltage measurement, switch SW-E for configuration and electrode PIN-E inserted into the earth at VCU-E's physical location; VCU-F has ADC-F for voltage measurement, switch SW-F for configuration and electrode PIN-F inserted into the earth at VCU-F's physical location. VCU-D, VCU-E and VCU-F are similar to VCU 770 of FIG. 27. The VCUs are interconnected such that HV pin (−) of VCU-D is connected to HV pin (+) of VCU-E via HV pin line 761 and HV pin (−) of VCU-E is connected to HV pin (+) of VCU-F via HV pin line 762. HV pin line 763 is connected to an upstream component while HV pin line 764 is connected to a downstream component.

In the example of FIG. 28, switch SW-D is configured to connect PIN-D to HV pin line 763, and similarly, switch SW-F is configured to connect PIN-F to HV pin line 762. Switch SW-E is configured to connect HV pin line 761 to HV pin line 762.

VCU-D effects a measurement of the voltage difference VDF between PIN-D and PIN-F, bypassing the electrode PIN-E. The set of VCUs 760 may be generalized to include a number N of VCUs connected together in series to form a system for which a number of combinations, larger than N, of differential voltages may be measured between the electrodes of the VCUs by configuring their HV pin line switches.

One benefit of the present invention compared to prior art techniques is the parallel collection of electrode electric potential measurements so that a set of test data may be accumulated rapidly. Analysis methods may be conceived that could take advantage of such a rapid data collection.

Figure 29:
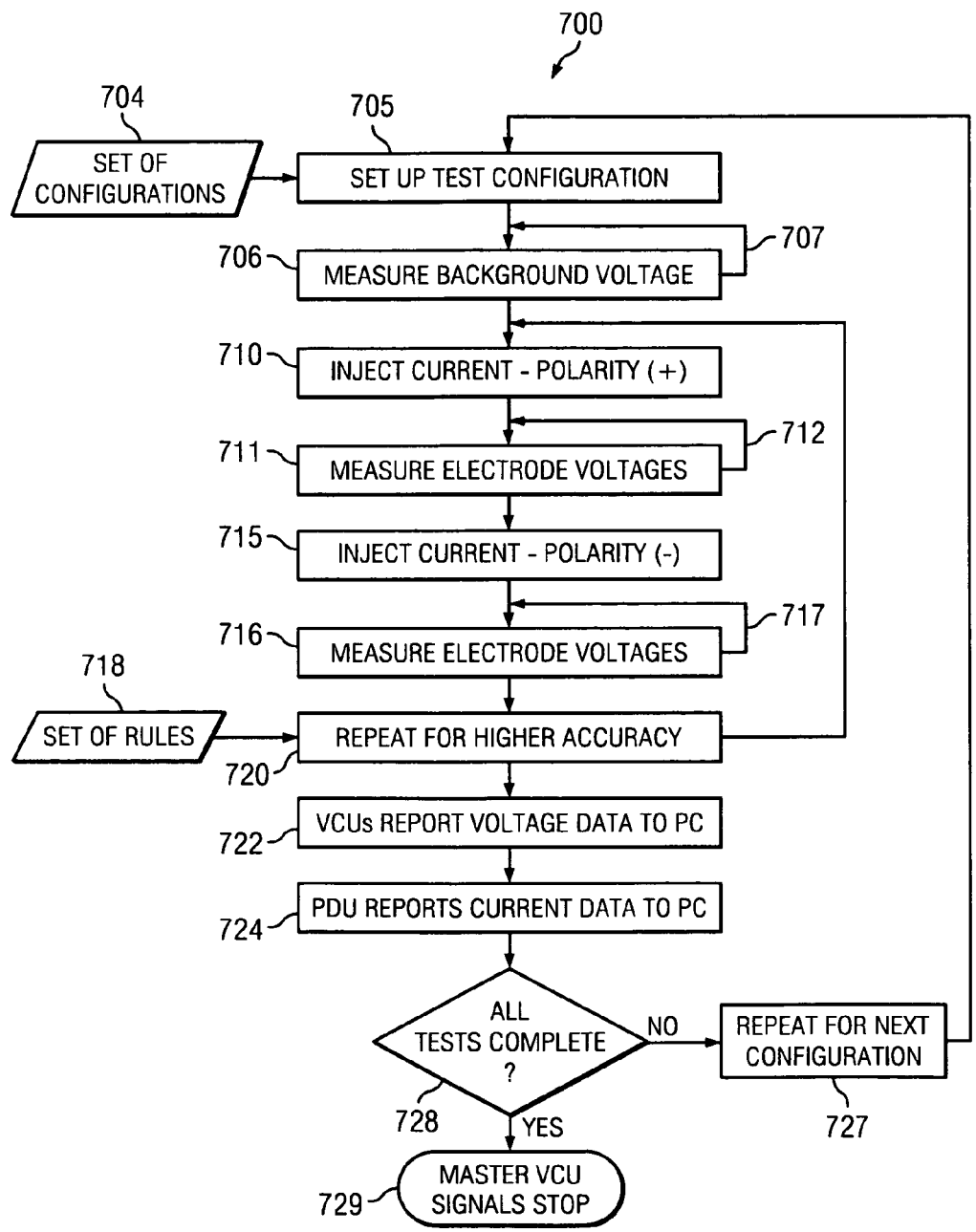
FIG. 29 is a flow chart diagram of a differential voltage measurement method.

A method consistent with differential electrode potential measurements and the parallel collection of the measurements is shown in method 700 of FIG. 29. Method 700 utilizes a communications system between a data collection computer, a PDU connected to the data collection computer, a master VCU and the set of VCUs, both connected to the PDU and all components communicatively connected as in the apparatus of FIG. 1 and FIG. 25. Alternatively, the apparatus of FIG. 27 may be used with method 700.

To begin the method, step 705 sets up one test configuration from a set of predefined configurations 704. A current injection pair of electrodes and a set of differential voltage measurements between a set of electrode measurement pairs are configured using the communications system wherein the master VCU sends out the test configuration to the set of VCUs. Once step 705 is complete, the background voltage is measured in steps 706, repeating a differential background voltage measurement for each electrode pair in the set of electrode measurement pairs wherein there is zero injection current being delivered to the earth.

Then in step 710 the injection current is applied by the PDU between a first electrode and a second electrode in the current injection pair of electrodes, the first electrode having a positive high voltage DC electric potential with respect to the second electrode. Once the high voltage current is stable, the PDU measures the injected current. The set of differential electrode voltages are then measured simultaneously in steps 711, for each electrode pair in the set of electrode measurement pairs.

Moving to step 715, the injection current is applied by the PDU between the current injection pair of electrodes such that the second electrode has a positive high voltage DC electric potential with respect to the first electrode. Step 715 thus reverses the electrical polarity of the measurement performed in step 710. Once the high voltage current is stable, the PDU again measures the injected current. The set of differential electrode voltages are measured simultaneously in steps 716, for each electrode pair in the set of electrode measurement pairs.

The measurements in steps 710, 711, 715 and 716 may be repeated via step 720 for higher accuracy using a predefined set of rules 718. An example of the predefined set of rules 718 is simply to repeat the steps 710 through 716 two times for each polarity. Other examples of rules may incorporate the calculation of the signal-to-noise ratio for the set of measurements, using for example the measured background voltage, and iterate the steps 710 through 716 until a predefined signal-to-noise threshold is surpassed.

Once the repetitions of step 720 have completed, the VCUs report the set of differential voltage measurements to the data collection computer in step 722.

Also in step 724, the PDU sends its measured injection current data to the data collection computer.

In step 728, the master VCU determines if all test configurations for the set of configurations 704 have been completed. If the configurations have all been tested, then master VCU signals the other components to stop further action. If the configurations have not all been tested, then method 700 is repeated in step 727.

While this preferred embodiment has been described in reference to a preferred embodiment along with other illustrative embodiments, this description is not intended to be construed in a limiting sense. Various modifications and combinations of the illustrative embodiments, as well as other embodiments of the preferred embodiment, will be apparent to persons skilled in the art upon reference to the description. It is therefore intended that the appended claims encompass any such modifications or embodiments.

The invention claimed is:

1. A system for collecting resistivity data from a subsurface media comprising:
    a power distribution unit distributing an injection current, an operating power source and an operating ground to a set of serially interconnected voltage control units;
    the power distribution unit further comprising a high voltage source, and a high voltage sink;
    a reference electrode in contact with a geological surface, connected to the power distribution unit for defining a high voltage reference;
    a current source connected to the power distribution unit;
    a data collection unit connected to the power distribution unit;
    an array of electrodes in contact with the geological surface, having at least three electrodes;
    the set of serially interconnected voltage control units connected to the array of electrodes to form a serially ordered chain of electrodes;
    the set of serially interconnected voltage control units in data communication with the power distribution unit,
    the set of serially interconnected voltage control units programmed to dispense the injection current into the array of electrodes in a predetermined pattern; and the set of serially interconnected voltage control units including a means to measure a set of differential voltages between electrode pairs in the serially ordered chain of electrodes and to send a first signal to the power distribution unit related to measured differential voltages.

2. The system of claim 1 wherein differential voltage measurements between electrode pairs are performed between physically adjacent electrode pairs in the serially ordered chain of electrodes.

3. The system of claim 1 wherein the current source is a battery.

4. The system of claim 1 wherein the data collection unit is programmed to receive a second signal from the power distribution unit related to measured voltages and to store a dataset related to measured voltages.

5. The system of claim 1 wherein the power distribution unit further comprises:
   a first power converter connected to the current source and the set of serially interconnected voltage control units;
   a high voltage power supply connected to the current source for supplying the injection current to the set of interconnected voltage control units;
   a microprocessor for translating communications between the set of voltage control units and the data collection unit;
   a voltmeter connected to the microprocessor for measuring the voltage at which the injection current is delivered; and
   an ammeter connected to the microprocessor for measuring the amount of injection current delivered.

6. The system of claim 5 wherein the microprocessor is programmed to proportionally control voltage from the high voltage source.

7. The system of claim 1 wherein each voltage control unit in the set of serially interconnected voltage control units further comprises:
   a microcontroller;
   volatile memory connected to the microcontroller;
   non-volatile memory connected to the microcontroller;
   an analog to digital converter connected to the microcontroller, attached to at least one electrode in the serially ordered chain of electrodes, and attached to a downstream electrode in the serially ordered chain of electrodes so as to make a measurement of a differential voltage between the at least one electrode and the downstream electrode;
   the microcontroller programmed to store the measurement in the volatile memory;
   an upstream communications port;
   a downstream communications port;
   a bi-directional transceiver connected to the upstream communications port, the downstream communications port and to the microcontroller;
   a first solid state switch connected to the at least one electrode and the high voltage source, the first solid state switch being connected to and controlled by the microcontroller so as to operationally connect the high voltage source to the at least one electrode;
   a second solid state switch connected to the at least one electrode and to the high voltage sink, the second solid state switch being connected to and controlled by the microcontroller so as to operationally connect the high voltage sink to the at least one electrode; and
   a capacitor connected to the operating power source for storing and supplying energy to the microcontroller, the voltage meter, the nonvolatile memory, the analog to digital converter, the bi-directional transceiver, the first solid state switch and the second solid state switch when the operating power source is disconnected.

8. The system of claim 7 further comprising a housing, the housing having a connection linking the at least one electrode and the first solid state switch, the second solid state switch, and the analog to digital converter; the housing further comprising a magnet adjacent the at least one electrode.

9. The system of claim 7 further comprising a set of test sequence tables stored in the non-volatile memory.

10. The system of claim 7 wherein each voltage control unit further comprises a measurement switch, the measurement switch connected to the analog to digital converter, the at least one electrode, the downstream electrode and to an upstream analog to digital converter contained in an upstream voltage control unit; and
   wherein the measurement switch programmed to connect:
   the at least one electrode to the analog to digital converter, and
   the upstream analog to digital converter to the downstream electrode.

11. A method of gathering resistivity data from a subsurface media with a system, the system comprising a power distribution unit for injecting current into the subsurface media, a data collection unit for gathering collecting resistivity data and a set of voltage control units each one attached to an electrode in an array of electrodes wherein the array of electrodes are grounded to subsurface media at geospatially distinct locations, the method comprising the steps of:
   providing the power distribution unit with the capability to measure the injected current;
   providing each voltage control unit with the programmable capability to measure differential voltage between geospatially distinct locations;
   providing each voltage control unit with the programmable capability to cause an attached electrode to do one of (a) source the injected current, (b) sink the injected current, and (c) neither source or sink the injected current,
   interconnecting the voltage control units in series using a wired connection suitable for communications, suitable for providing a low voltage power, suitable for providing high voltage current and suitable for interconnecting electrodes between voltage control units;
   providing the data collection unit with the capability for communicating with the power distribution unit and voltage control units;
   providing a set of test configurations wherein each test configuration defines the operations of each voltage control unit, the operations of the power distribution unit and further predefines the electrode pairs required for differential voltage measurements;
   for each test configuration in the set of test configurations repeating the steps of:
      communicating a test configuration to the set of voltage control units and the power distribution unit;
      conditionally repeating the further steps of:
         measuring a background differential voltage between each pair of electrodes as required by the test configuration;
         injecting current from a first electrode in the array of electrodes to the subsurface media and sinking current from the subsurface media into a second electrode in the array of electrodes;
         measuring differential voltages between all predefined electrode pairs according to the test configuration;

injecting current from the second electrode to the subsurface media and sinking current from the subsurface media into the first electrode;

measuring differential voltages between all predefined electrode pairs according to the test configuration;

checking a predefined set of rules to determine if the conditional steps should be repeated again;

reporting the measured differential voltages to the data collection unit;

reporting the measured injection current to the data collection unit; and stopping the system from further measurements.

12. The method of claim 11 wherein differential voltages are measured between electrodes of connectively adjacent voltage control units.

13. The method of claim 11 wherein differential voltages are measured between electrodes of connectively non-adjacent voltage control units.

* * * * *